United States Patent
Edge et al.

(10) Patent No.: US 9,137,770 B2
(45) Date of Patent: Sep. 15, 2015

(54) EMERGENCY CIRCUIT-MODE CALL SUPPORT

(75) Inventors: Stephen W. Edge, Escondido, CA (US);
Kirk Allan Burroughs, Alamo, CA (US); Andreas Klaus Wachter, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 11/532,044

(22) Filed: Sep. 14, 2006

(65) Prior Publication Data

US 2007/0135089 A1 Jun. 14, 2007

Related U.S. Application Data

(60) Provisional application No. 60/717,620, filed on Sep. 15, 2005, provisional application No. 60/730,312, filed on Oct. 25, 2005, provisional application No. 60/749,294, filed on Dec. 9, 2005, provisional application No. 60/749,233, filed on Dec. 9, 2005.

(51) Int. Cl.
*H04M 11/04* (2006.01)
*H04W 64/00* (2009.01)
(Continued)

(52) U.S. Cl.
CPC ............... *H04W 64/00* (2013.01); *H04W 4/22* (2013.01); *H04W 76/007* (2013.01); *H04W 76/02* (2013.01); *H04W 84/04* (2013.01)

(58) Field of Classification Search
USPC ........... 455/404.1, 456.1–457, 422, 509, 450, 455/436, 453, 442, 452.2, 404.2, 437, 433, 455/67.11; 379/45
See application file for complete search history.

(56) References Cited

U.S. PATENT DOCUMENTS 5,155,165 A 10/1992 Maruyama et al.
5,712,900 A 1/1998 Maupin et al.
(Continued)

FOREIGN PATENT DOCUMENTS

CA 2523923 6/2005
CN 1359585 A 7/2002
(Continued)

OTHER PUBLICATIONS

Abbott, N.: "Alternatives for Providing Routing and Location Information to Support Emergency Calling from IP Enterprises", NENA Technical Information Document, pp. 1-16, XP002323684 (Oct. 3, 2003).

(Continued)

*Primary Examiner* — Joseph Arevalo
(74) *Attorney, Agent, or Firm* — Andrea Mays; Thomas A. Jolly

(57) ABSTRACT

Techniques to support emergency circuit-mode calls are described. The techniques may be used for various 3GPP and 3GPP2 networks, various location architectures, and various types of User Equipment (UE). A UE establishes a circuit-mode call with a wireless network for emergency services. The UE interacts with a location server indicated by the wireless network. The UE performs user plane location with the location server during the circuit-mode call to obtain a position estimate for the UE. The UE communicates with a PSAP, which may be selected based on the position estimate, for the emergency circuit-mode call. The UE may perform positioning with the location server to obtain an updated position estimate for the UE, e.g., whenever requested by the PSAP.

81 Claims, 10 Drawing Sheets

(51) Int. Cl.

| | | |
|---|---|---|
| H04W 4/22 | (2009.01) | |
| H04W 76/00 | (2009.01) | |
| H04W 76/02 | (2009.01) | |
| H04W 84/04 | (2009.01) | |

(56) References Cited

U.S. PATENT DOCUMENTS

| | | | |
|---|---|---|---|
| 6,058,311 | A | 5/2000 | Tsukagoshi |
| 6,771,742 | B2* | 8/2004 | McCalmont et al. .......... 379/45 |
| 7,155,201 | B2* | 12/2006 | Saucedo et al. ............ 455/404.1 |
| 7,218,940 | B2 | 5/2007 | Niemenmaa et al. |
| 7,602,886 | B1 | 10/2009 | Beech et al. |
| 7,623,447 | B1 | 11/2009 | Faccin et al. |
| 7,869,817 | B2* | 1/2011 | Shim .................... 455/456.3 |
| 2002/0042260 | A1 | 4/2002 | Saucedo et al. ............ 455/404 |
| 2003/0021413 | A1 | 1/2003 | Kiiveri et al. |
| 2003/0027569 | A1 | 2/2003 | Ejzak |
| 2003/0086539 | A1 | 5/2003 | McCalmont et al. |
| 2004/0095932 | A1 | 5/2004 | Astarabadi et al. |
| 2004/0109459 | A1 | 6/2004 | Madour et al. |
| 2004/0122934 | A1 | 6/2004 | Westman et al. |
| 2004/0125802 | A1 | 7/2004 | Lillie et al. |
| 2004/0137873 | A1 | 7/2004 | Kauppinen et al. |
| 2004/0157620 | A1* | 8/2004 | Nyu ..................... 455/456.1 |
| 2004/0162892 | A1 | 8/2004 | Hsu |
| 2004/0190522 | A1 | 9/2004 | Aerrabotu et al. |
| 2004/0192252 | A1 | 9/2004 | Aerrabotu et al. |
| 2004/0203566 | A1 | 10/2004 | Leung |
| 2004/0203914 | A1* | 10/2004 | Kall et al. ............... 455/456.1 |
| 2004/0242238 | A1* | 12/2004 | Wang et al. ............. 455/456.1 |
| 2005/0003829 | A1 | 1/2005 | Lala et al. |
| 2005/0090225 | A1 | 4/2005 | Muehleisen et al. |
| 2005/0130659 | A1 | 6/2005 | Grech et al. |
| 2005/0153687 | A1* | 7/2005 | Niemenmaa et al. ...... 455/414.2 |
| 2005/0153706 | A1* | 7/2005 | Niemenmaa et al. ...... 455/456.1 |
| 2005/0190892 | A1 | 9/2005 | Dawson et al. |
| 2005/0213565 | A1 | 9/2005 | Barclay et al. |
| 2005/0213716 | A1 | 9/2005 | Zhu et al. |
| 2005/0239480 | A1* | 10/2005 | Kim et al. ............... 455/456.1 |
| 2005/0250516 | A1* | 11/2005 | Shim ..................... 455/456.1 |
| 2005/0255857 | A1* | 11/2005 | Kim et al. ............... 455/456.1 |
| 2006/0072542 | A1 | 4/2006 | Sinnreich et al. |
| 2006/0154645 | A1* | 7/2006 | Valkenburg ............... 455/411 |
| 2006/0194594 | A1* | 8/2006 | Ruutu et al. ............. 455/456.5 |
| 2006/0258371 | A1* | 11/2006 | Krishnamurthi et al. .. 455/456.1 |
| 2006/0274696 | A1* | 12/2006 | Krishnamurthi ........... 370/331 |
| 2006/0276168 | A1* | 12/2006 | Fuller et al. ............. 455/404.2 |
| 2007/0003024 | A1* | 1/2007 | Olivier et al. ............... 379/45 |
| 2007/0060097 | A1 | 3/2007 | Edge et al. |
| 2007/0066277 | A1 | 3/2007 | Bharatia et al. |
| 2007/0121560 | A1* | 5/2007 | Edge ..................... 370/338 |
| 2007/0184854 | A1 | 8/2007 | Niemenmaa et al. |
| 2007/0190968 | A1 | 8/2007 | Dickinson et al. |
| 2008/0008157 | A1 | 1/2008 | Edge et al. |
| 2010/0067444 | A1 | 3/2010 | Faccin et al. |
| 2014/0376414 | A1 | 12/2014 | Edge et al. |

FOREIGN PATENT DOCUMENTS

| | | |
|---|---|---|
| CN | 1422507 A | 6/2003 |
| CN | 1474577 A | 2/2004 |
| EP | 0789498 A2 | 8/1997 |
| EP | 0917378 A2 | 5/1999 |
| EP | 1526697 | 4/2005 |
| EP | 1422909 B1 | 4/2006 |
| JP | 2001509973 A | 7/2001 |
| JP | 2003516669 A | 5/2003 |
| JP | 2003198757 A | 7/2003 |
| JP | 2003319437 A | 11/2003 |
| JP | 2004502387 T | 1/2004 |
| JP | 2004120715 A | 4/2004 |
| JP | 2004535645 A | 11/2004 |
| JP | 2005514803 | 5/2005 |
| JP | 2005525030 A | 8/2005 |
| JP | 2005268894 A | 9/2005 |
| JP | 2006005504 A | 1/2006 |
| JP | 2006014190 A | 1/2006 |
| JP | 2006033004 A | 2/2006 |
| JP | 2006080962 A | 3/2006 |
| JP | 2006101516 A | 4/2006 |
| JP | 2006121526 A | 5/2006 |
| JP | 2007513580 A | 5/2007 |
| JP | 2006521767 | 3/2011 |
| RU | 2073913 | 2/1997 |
| RU | 2002129896 | 3/2004 |
| RU | 2292670 | 6/2005 |
| WO | 0203718 | 1/2002 |
| WO | WO02065791 A1 | 8/2002 |
| WO | WO 02/003718 A2 * | 10/2002 |
| WO | WO02093953 | 11/2002 |
| WO | WO03045084 A2 | 5/2003 |
| WO | WO03094563 A1 | 11/2003 |
| WO | WO2004080096 | 9/2004 |
| WO | WO2004/086772 A2 * | 10/2004 |
| WO | 2005039227 A1 | 4/2005 |
| WO | WO-2005039223 A1 | 4/2005 |
| WO | WO-2005057884 A2 | 6/2005 |
| WO | WO2005069671 A1 | 7/2005 |
| WO | 2007016695 | 2/2007 |
| WO | 2007043772 A1 | 4/2007 |
| WO | 2007127991 | 11/2007 |

OTHER PUBLICATIONS

3GGP2, "Introduction to cdma2000 Standards for Spread Spectrum Systems, Release D," 3GPP2 C.S0001-D, Version 2, pp. 1-16 (Sep. 2005).

3GGP2, "IP-Based Location Services. Revision 0" 3GPP2 X.S0024-0, Version 1.0, pp. 1-215 (Oct. 2005).

3GPP, "3rd Generation Partnership Project; Technical Specification Group GSM/EDGE Radio Access Network; Functional Stage 2 description of Location Services (LCS) in GERAN (Release 7)," 3GPP TS 43.059 v7.0.0, pp. 1-67 (Apr. 2005).

3GPP, "3rd Generation Partnership Project; Technical Specification Group GSM/EDGE Radio Access Network; Generic access to the A/Gb interface; Stage 2", 3GPP TS 43.318 v6.7.0, pp. 1-71 (Jun. 2006).

3GPP, "3rd Generation Partnership Project; Technical Specification Group Radio Access Network; Stage 2 functional specification of User Equipment (UE) positioning in UTRAN (Release 6)," 3GPP TS 25.305 v6.1.0, pp. 1-54 (Jun. 2004).

3GPP. "3rd Generation partnership Project; Technical Specification Group Service and Systems Aspects; IP Multimedia Subsystem (IMS) emergency sessions (Release 7)," pp. 1-33, XP002468569 (Jun. 13, 2003).

3GPP, "3rd Generation Partnership Project; Technical Specification Group Services and System Aspects; Functional stage 2 description of Location Services (LCS)(Release 7)," 3GPP TS 23.271 v7.1.0. pp. 1-120 (Jun. 2005).

3GPP. "3rd Generation Partnership Project: Technical Specification Group Services and System Aspects; Generic Authentication Architecture (GAA); Generic bootstrapping architecture (Release 7)," 3GPP TS 33.220 v7.5.0, pp. 1-71 (Sep. 2006).

3GPP, "3rd Generation Partnership Project; Technical Specification Group Services and Systems Aspects; Generic Authentication Architecture (GAA); Access to network application functions using Hypertext Transfer Protocol over Transport Layer Security (HTTPS)(Release 7)," 3GPP TS 33.222 v7.2.0, pp. 1-21 (Sep. 2006).

3GPP2, "cdma 2000 High Rate Packet Data Air Interface Specification," 3Gpp2 C.S0024-A, Version 2.0, pp. 1-1227 (Jul. 2005).

3GPP2, "IP-Based Location Services Security Framework," 3GPP2 S.S0110-0, Version 1.0, pp. 1-60 (Feb. 2006).

3GPP2, "MAP Location Services Enhancements," 3GPP2 X.S0002-0, Version 2.0, pp. 1-234 (May 2006).

EIA/TIA Interim Standard, "Cellular System Dual-Mode Mobile Station—Base Station Compatibility Standard," IS-54, pp. 1-226 (May 1990).

Joint Standard, "Enhanced Wireless 9-1-1 Phase 2," J-STD-036-A (Revision of IS-J-STD-036), pp. 1-294 (Jun. 2002).

(56) References Cited

OTHER PUBLICATIONS

Open Mobile Alliance, "Secure User Plane Location Architecture, Candidate Version 1.0," OMA-AD-SUPL-V1_0-20060906-C, pp. 1-80 (Sep. 2006).
Open Mobile Alliance, "Secure User Plane Location Architecture, Draft Version 2.0," OMA-AD-SUPL-V2_0-20060823-D, pp. 1-54 (Aug. 2006).
Open Mobile Alliance, "UserPlane Location Protocol Draft Version 2.0," OMA-TS-ULP-V2_0-20060907-D, pp. 1-243 (Sep. 2006).
Qualcomm: "VoIP Emergency Call Support," 3GPP TSG SA WG2 Architecture—S2#48, pp. 1-23, (Sep. 2005).
RFC 2246: "The TLS Protocol", Version 1.0, Network Working Group, Request for Comments, pp. 1-100 (Jan. 1999).
RFC 4279: "Pre-Shared Key Ciphersuites for Transport Layer Security (TLS)," Network Working Group, Request for Comments, pp. 1-20 (Dec. 2005).
TIA Document, "TIA/EIA-41-D Location Services Enhancements," pp. 1-238, TIA-881 (Mar. 2004).
TIA/EIA Standard, "Mobile Station-Base Station Compatibility Standard for Wideband Spread Spectrum Cellular Systems," TIA/EIA-95-B (Upgrade and Revision of TIA/EIA-95-A), pp. 1-1206 (Mar. 1999).
Universal Mobile Telecommunications System (UMTS); UTRAN lub and Iur interface user plane protocol for DCH data streams (3GPP TS 25.427 version 5.0.0 Release 5), ETSI TS 125 427 V5.0.0., pp. 1-35 (Mar. 2002).
International Search Report, PCT/US2006/036488—International Search Authority—European Patent Office—Sep. 7, 2007.
International Preliminary Report on Patentability, PCT/US2006/036488—The International Bureau of WIPO—Geneva, Switzerland—Mar. 18, 2008.
Written Opinion, PCT/US2006/036488—International Search Authority—European Patent Office—Sep. 7, 2007.
OMA-AD-SULP-V2_0-20060704-D, "Secure User Plane Location Architecture" Draft Version 4.0, Jul. 4, 2006.
OMA-TS-ULP-V2_0-20060721-D"User Plane Protocol" Draft Version 2.0, Jul. 21, 2006.
3rd Generation Partnership Project; Technical Specification Group Services and System Aspects; Internet Protocol (IP) based IP Multimedia Subsystem (IMS) emergency sessions; (Release 7), 3GPP TR 23.867 V1.0.0, May 2005.
Schulzrinne H: "Emergency Services for Internet Telephony Systems; draft—schulzrinne-sipping-emergency-arch-02", IETF Standard-Working-Draft, Internet Engineering Task Force, IETF, Ch, No. 2, Oct. 18, 2004, XP015039663, ISSN: 0000-0004.
Lucent Technologies: "Location for IMS Emergency Calls", 3GPP TSG SA WG2 Architecture—S2#45, S2-050605, pp. 1-9, Apr. 8, 2005.
3rd Generation Partnership Project; Technical Specification Group Services and System Aspects; Internet Protocol (IP) based IP Multimedia Subsystem (IMS) emergency sessions; (Release 7), 3GPP TR 23.867 V2.0.0, pp. 1-80, May 2005.

\* cited by examiner

EMERGENCY CIRCUIT-MODE CALL SUPPORT

The present application claims priority to provisional U.S. Application Ser. No. 60/717,620, entitled "LOCATION SERVICES (LCS) USER PLANE SUPPORT FOR E911/E112," filed Sep. 15, 2005, and Ser. No. 60/730,312, entitled "SUPPORT OF CIRCUIT SWITCHED EMERGENCY SERVICES CALLS WITH SUPL 1.0," filed Oct. 25, 2005, Ser. No. 60/749,294, entitled "SUPPORT FOR EMERGENCY CIRCUIT MODE CALLS USING SUPL," filed Dec. 9, 2005, and Ser. No. 60/749,233, entitled "ENHANCEMENTS IN SUPL 2.0 NEEDED TO SUPPORT EMERGENCY CALLS," filed Dec. 9, 2005, all assigned to the assignee hereof and incorporated herein by reference.

BACKGROUND

1. Field

The present disclosure relates generally to communication, and more specifically to techniques for supporting emergency calls.

2. Background

Wireless communication networks are widely deployed to provide various communication services such as voice, video, packet data, messaging, broadcast, and so on. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

Wireless networks typically support communication for users that have service subscriptions with these networks. A service subscription may be associated with information for security, routing, quality of service (QoS), billing, and so on. The subscription-related information may be used to establish calls with a wireless network.

A user may place an emergency voice call with a wireless network that may or may not be a home network with which the user has service subscription. A major challenge is to route the emergency call to an appropriate Public Safety Answering Point (PSAP) that can service the call. This may entail obtaining an interim position estimate for the user and determining the proper PSAP based on the interim position estimate. The problem is compounded if the user is roaming and/or has no service subscription with any network.

There is therefore a need in the art for techniques to support emergency calls.

SUMMARY

Techniques to support emergency circuit-mode calls are described herein. The techniques may be used for various 3GPP and 3GPP2 networks, various location architectures, and User Equipments (UEs) with and without service subscription.

In an embodiment, a UE establishes a circuit-mode call with a wireless network for emergency services. The UE interacts with a location server indicated by the wireless network. The UE performs user plane location with the location server during the circuit-mode call to obtain a position estimate for the UE. User plane location refers to a process to determine the location of a target UE in which signaling between the UE and a location server is conveyed using data communication capabilities provided by a serving wireless network and/or by other networks. User plane location may be based on a user plane solution/architecture such as OMA Secure User Plane Location (SUPL) or 3GPP2 X.S0024. Signaling for user plane location may be achieved via packet-mode communication. The UE establishes the emergency circuit-mode call to a PSAP, which may be selected based on the position estimate for the UE. The UE may perform positioning with the location server to obtain an updated position estimate for the UE, e.g., whenever requested by the PSAP.

Various aspects and embodiments of the disclosure are described in further detail below.

DETAILED DESCRIPTION

Techniques for supporting circuit-mode emergency calls are described herein. A circuit-mode call is a call in which dedicated resources (e.g., radio traffic channels) are assigned for the call. A circuit-mode call is also referred to as a circuit-switched call and is different from a packet-switched call in which data is sent in packets using shared resources. An emergency circuit-mode call is a circuit-mode call for emergency services. An emergency circuit-mode call may be identified as such and may be distinguished from a normal circuit-mode call in several manners, as described below. An emergency circuit-mode call may be associated with various characteristics that are different from a normal circuit-mode call such as, e.g., obtaining a suitable position estimate for a user, routing the emergency circuit-mode call to an appropriate PSAP, supporting the user even without a service subscription, and so on.

In the description herein, the term "location" typically refers to a process to obtain and provide the geographic position of a target UE. The term "positioning" typically refers to a process to measure/compute a geographic position estimate of the target UE. Location may or may not invoke positioning, depending on whether a suitable position estimate is already available. A position estimate is also referred to as a location estimate, a position fix, and so on.

Figure 1:
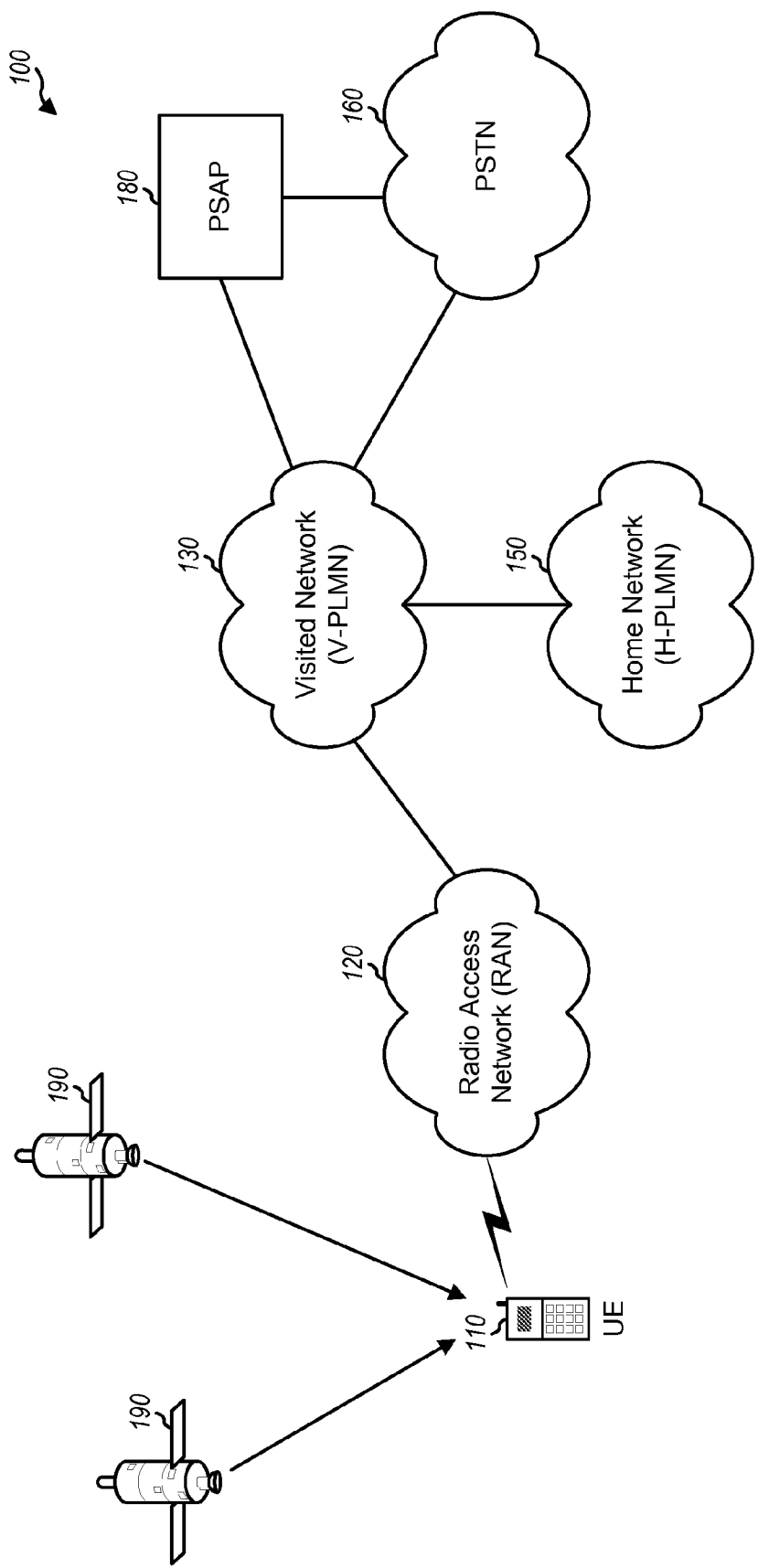
FIG. 1 shows a deployment that supports emergency circuit-mode calls.

FIG. 1 shows a deployment 100 that supports emergency circuit-mode calls. A User Equipment (UE) 110 communicates with a radio access network (RAN) 120 to obtain communication services. UE 110 may be stationary or mobile and may also be called a mobile station (MS), a terminal, a subscriber unit, a station, or some other terminology. UE 110 may be a cellular phone, a personal digital assistant (PDA), a wireless device, a laptop computer, a telemetry device, a tracking device, and so on. UE 110 may communicate with one or more base stations in RAN 120. UE 110 may also receive signals from one or more satellites 190, which may be part of the United States Global Positioning System (GPS), the European Galileo system, the Russian GLONASS system, or some other satellite positioning system (SPS). UE 110 may measure signals from base stations in RAN 120 and/or signals from satellites 190. UE 110 may obtain pseudo-range measurements for the satellites and/or timing measurements for the base stations. The pseudo-range measurements and/or timing measurements may be used to derive a position estimate for UE 110 using one or more positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, and so on.

RAN 120 provides radio communication for UEs located within the coverage area of the RAN. RAN 120 is associated with a visited network 130, which is the network currently serving UE 110. A visited network may also be called a Visited Public Land Mobile Network (V-PLMN). A home network 150, which may also be called a Home PLMN (H-PLMN), is a network with which UE 110 has subscription. Visited network 130 and home network 150 may be the same or different networks and, if they are different networks, may or may not have roaming agreement.

A network 160 may include a Public Switched Telephone Network (PSTN) and/or other voice and data networks. A PSTN supports communication for conventional plain old telephone service (POTS). A PSAP 180 is an entity responsible for answering emergency calls (e.g., for police, fire, and medical services) and may also be referred to as an Emergency Center (EC). An emergency call may be initiated when a user dials a fixed well-known number such as 911 in North America or 112 in Europe. PSAP 180 is typically operated or owned by a government agency, e.g., county or city. PSAP 180 supports communication with PSTN 160.

The techniques described herein may be used for emergency circuit-mode calls in various wireless communication networks such as CDMA, TDMA, FDMA, and OFDMA networks, wireless local area networks (WLANs), and/or other networks. A CDMA network may implement one or more radio technologies such as Wideband-CDMA (W-CDMA), cdma2000, and so on. cdma2000 covers IS-2000, IS-856, and IS-95 standards. A TDMA network may implement one or more radio technologies such as Global System for Mobile Communications (GSM), Digital Advanced Mobile Phone System (D-AMPS), and so on. D-AMPS covers IS-248 and IS-54. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. These various radio technologies and standards are known in the art. A 3GPP Generic Access Network (GAN) may utilize a WLAN to provide circuit-mode access, as described in 3GPP TS 43.318.

Figure 2:
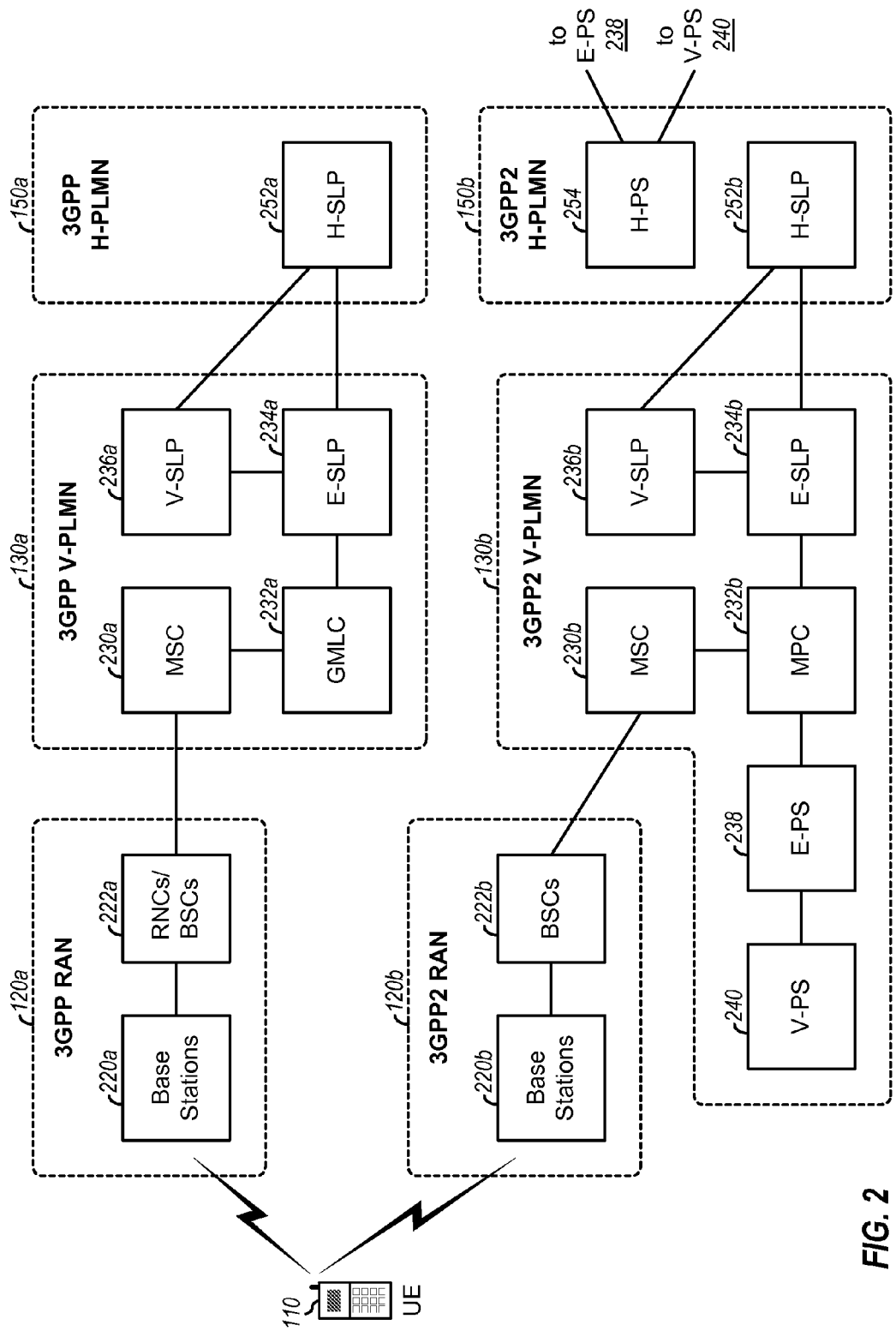
FIG. 2 shows 3GPP and 3GPP2 network architectures.

FIG. 2 shows 3GPP and 3GPP2 network architectures. UE 110 may gain radio access via a 3GPP RAN 120*a*, which may be a GSM EDGE Radio Access Network (GERAN), a Universal Terrestrial Radio Access Network (UTRAN), an Evolved UTRAN (E-UTRAN), a WLAN, or some other access network. 3GPP RAN 120*a* includes base stations 220*a*, Radio Network Controllers/Base Station Controllers (RNCs/BSCs) 222*a*, and other entities not shown in FIG. 2. A base station may also be called a Node B, an enhanced Node B (e-Node B), a Base Transceiver Station (BTS), an access point (AP), or some other terminology.

A 3GPP V-PLMN 130*a* is one embodiment of visited network 130 in FIG. 1 and may include a Mobile Switching Center (MSC) 230*a*, a Gateway Mobile Location Center (GMLC) 232*a*, an Emergency Services SUPL Location Platform (E-SLP) 234*a*, and a Visited SLP (V-SLP) 236*a*. GMLC 232*a*, E-SLP 234*a*, and V-SLP 236*a* provide location services for UEs in communication with V-PLMN 130*a*. GMLC 232*a* supports some functions of a conventional GMLC (e.g., as defined in 3GPP TS 23.271 and J-STD-036) and some functions related to the use of SUPL for location and routing of emergency calls. E-SLP 234*a* and V-SLP 236*a* support SUPL from Open Mobile Alliance (OMA). E-SLP 234*a* substitutes for a Home SLP (H-SLP) in the case of location of emergency calls and may be combined with GMLC 232*a*. V-SLP 236*a* may be located within or outside of V-PLMN 130*a* and may be geographically closer to UE 110.

UE 110 may also gain radio access via a 3GPP2 RAN 120*b*, which may be a CDMA2000 1X network or some other access network. 3GPP2 RAN 120*b* includes base stations 220*b*, BSCs 222*b*, and other entities not shown in FIG. 2.

A 3GPP2 V-PLMN 130*b* is another embodiment of visited network 130 in FIG. 1 and may include an MSC 230*b*, a Mobile Positioning Center (MPC) 232*b*, an E-SLP 234*b*, and a V-SLP 236*b*. MPC 232*b*, E-SLP 234*b*, and V-SLP 236*b* provide location services for UEs in communication with V-PLMN 130*b*. MPC 232*b* supports some functions of a conventional MPC (e.g., as defined in 3GPP2 X.S0002, TIA-881, and J-STD-036) and some functions related to the use of SUPL for location and routing of emergency calls. E-SLP 234*b* and V-SLP 236*b* support SUPL from OMA. E-SLP 234*b* may also be combined with MPC 232*b*. Alternatively or additionally, V-PLMN 130*b* may include an Emergency Services Position Server (E-PS) 238 and a Visited PS (V-PS) 240. E-PS 238 and V-PS 240 are location servers that support X.S0024 location for cdma2000 networks and are similar to E-SLP 234*b* and V-SLP 236*b* for SUPL. V-SLP 236*b* and V-PS 240 may be located within or outside of V-PLMN 130*b* and may be geographically closer to UE 110. V-PLMN 130*b* may also include a Position Determining Entity (PDE) and/or other entities.

A 3GPP H-PLMN 150*a* is one embodiment of home network 150 in FIG. 1 and may include an H-SLP 252*a* and/or other network entities. A 3GPP2 H-PLMN 150*b* is another embodiment of home network 150 in FIG. 1 and may include an H-SLP 252*b*, an H-PS 254, and/or other network entities.

The entities in SUPL are described in OMA-AD-SUPL-V2_0-20060823-D, entitled "Secure User Plane Location Architecture," Draft Version 2.0, Aug. 23, 2006, and in OMA-TS-ULP-V2_0-20060907-D, entitled "User Plane Location Protocol," Draft Version 2.0, Sep. 7, 2006. The entities in X.S0024 location are described in 3GPP2 X.S0024, entitled "IP-Based Location Services," Version 1.0, October 2005. These documents are publicly available.

For simplicity, FIG. 2 shows only some of the entities in 3GPP and 3GPP2, which are referred to in the description below. 3GPP and 3GPP2 networks may include other entities defined by 3GPP and 3GPP2, respectively.

A wireless network may support location services (LCS) using a control plane (CP) solution and/or a user plane (UP) solution. A control plane (which is also called a signaling plane) is a mechanism for carrying signaling for higher-layer applications and is typically implemented with network-specific protocols, interfaces and signaling messages. A user plane is a mechanism for carrying signaling for higher-layer applications and employing a user-plane bearer, which is typically implemented with protocols such as User Datagram Protocol (UDP), Transmission Control Protocol (TCP), and Internet Protocol (IP). Messages supporting location services and positioning are carried as part of signaling in a control plane architecture and as part of data (from a network perspective) in a user plane architecture. The content of the messages may, however, be the same or similar in both architectures. 3GPP control plane is described in 3GPP TS 23.271, TS 43.059, and TS 25.305. 3GPP2 control plane is described in IS-881 and 3GPP2 X.S0002. SUPL and pre-SUPL are described in documents from OMA.

Emergency circuit-mode calls in a wireless network are typically supported using a control plane solution rather than a user plane solution. This means that a network operator may need to deploy both control plane and user plane solutions in order to support all location related applications.

The techniques described herein support emergency circuit-mode calls using a combination of control plane and user plane solutions. This may have an advantage in simplifying implementation since the entities to support parts of control plane LCS are deployed and supported by many 3GPP and 3GPP2 network operators. However, the techniques incorporate only a small portion of the control plane solution, thus avoiding any significant increase in cost and complexity when upgrading to a user plane solution. In particular, a network operator may be able to support all location related applications without deploying a full control plane solution.

The techniques support registered UEs as well as unregistered UEs. A registered UE is a UE that has registered with a home network and can be authenticated via the home network. An unregistered UE is a UE that has not registered with any network and is not authenticated. A 3GPP UE may be equipped with a Universal Integrated Circuit Card (UICC) or a Subscriber Identity Module (SIM). A 3GPP2 UE may be equipped with a User Identity Module (UIM). A UICC, SIM or UIM is typically specific to one subscriber and may store personal information, subscription information, and/or other information. A UICC-less UE is a UE without a UICC or SIM. A UIM-less UE is a UE without a UIM. A UICC/UIM-less UE is not registered with any network and has no subscription, no home network, and no authentication credentials (e.g., no secret key) to verify any claimed identity, which makes location services more risk-prone.

Figure 3:
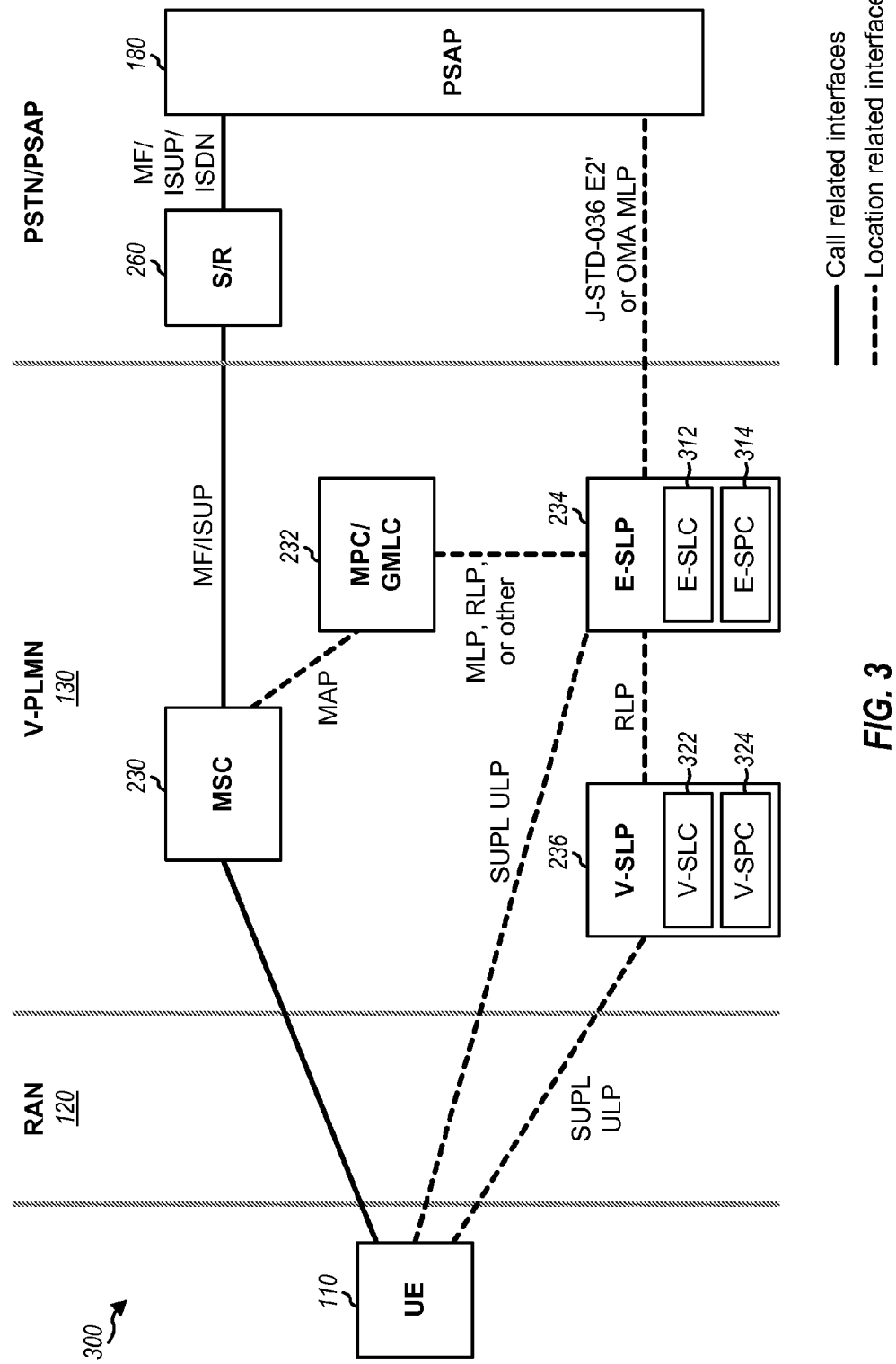
FIG. 3 shows a network architecture for SUPL location.

FIG. 3 shows an embodiment of a network architecture 300 for emergency circuit-mode call with SUPL location. Network architecture 300 is applicable for both 3GPP and 3GPP2 networks. For simplicity, FIG. 3 shows only entities and interfaces relevant to support of emergency circuit-mode call using SUPL. In general, network architecture 300 may include other entities to support circuit-mode call and/or location.

UE 110 is referred to as a SUPL enabled terminal (SET) in SUPL. RAN 120 may be 3GPP RAN 120a, 3GPP2 RAN 120b, or some other access network. E-SLP 234 may include a SUPL Location Center (E-SLC) 312 that performs various functions for location services and a SUPL Positioning Center (E-SPC) 314 that supports positioning for UEs. V-SLP 236 may similarly include a V-SLC 322 and a V-SPC 324. E-SLP 234 is associated with MPC/GMLC 232 and replaces H-SLP 252 in H-PLMN 150 in case of location for emergency calls. V-SLP 236 may be closer and/or better able to locate UE 110. In most cases, E-SLP 234 alone is sufficient, and V-SLP 236 is not needed.

SUPL supports two communication modes between a SET and an SLP for positioning with an SPC. In a proxy mode, the SPC does not have direct communication with the SET, and the SLP acts as a proxy between the SET and the SPC. In a non-proxy mode, the SPC has direct communication with the SET.

PSTN 160 may include a Selective Router (S/R) 260 and/or other tandems used to establish an emergency circuit-mode call from MSC 230 to PSAP 180. S/R 260 may belong to PSAP 180 or may be shared by and connected to a set of PSAPs. UE 110 may communicate with PSAP 180 via MSC 230 and S/R 260.

FIG. 3 also shows the interfaces between various entities. The call related interfaces between UE 110 and RAN 120 and between RAN 120 and MSC 230 are network specific. The call related interface between MSC 230, S/R 260 and PSAP 180 may be Multi Frequency/ISDN User Part/ISDN (MF/ISUP/ISDN).

The location related interfaces between UE 110 and E-SLP 234 and V-SLP 236 may be SUPL UserPlane Location Protocol (ULP). The interface between E-SLP 234 and V-SLP 236 may be Roaming Location Protocol (RLP). The interface between MSC 230 and GMLC/MPC 232 may be Mobile Application Part (MAP). The interface between MPC/GMLC 232 and E-SLP 234 resembles both a Le/L1 interface between a SUPL agent and an H-SLP and an Lr/LCS-z interface between a pair of SLPs in SUPL 1.0. Thus, the interface between MPC/GMLC 232 and E-SLP 234 may be supported using Mobile Location Protocol (MLP), RLP, an enhanced version of MLP or RLP, or some other interface. For RLP, GMLC support is already defined with respect to RLP transaction initiation. For MLP, the GMLC normally acts as a transaction recipient. The interface between E-SLP 234 and PSAP 180 may be an E2 interface defined in J-STD-036 rev. B, MLP, an HTTP interface, or some other interface.

Several example message flows for emergency circuit-mode call in 3GPP and 3GPP2 with SUPL location are described below. For clarity, entities that are less relevant (e.g., RAN 120 and S/R 260) are omitted from these message flows but are included in the descriptions. These message flows assume that UE 110 has a UICC or UIM and that there is roaming agreement between V-PLMN 130 and H-PLMN 150. The message flows also assume that UE 110 supports both circuit-mode (for an emergency call) and packet-mode (e.g., for location) communication in parallel. This capability is currently allowed for registered users by 3GPP in UMTS and GSM/GPRS and by 3GPP2 in cdma2000.

1. Emergency Circuit-Mode Call in 3GPP with SUPL Location

Figure 4:
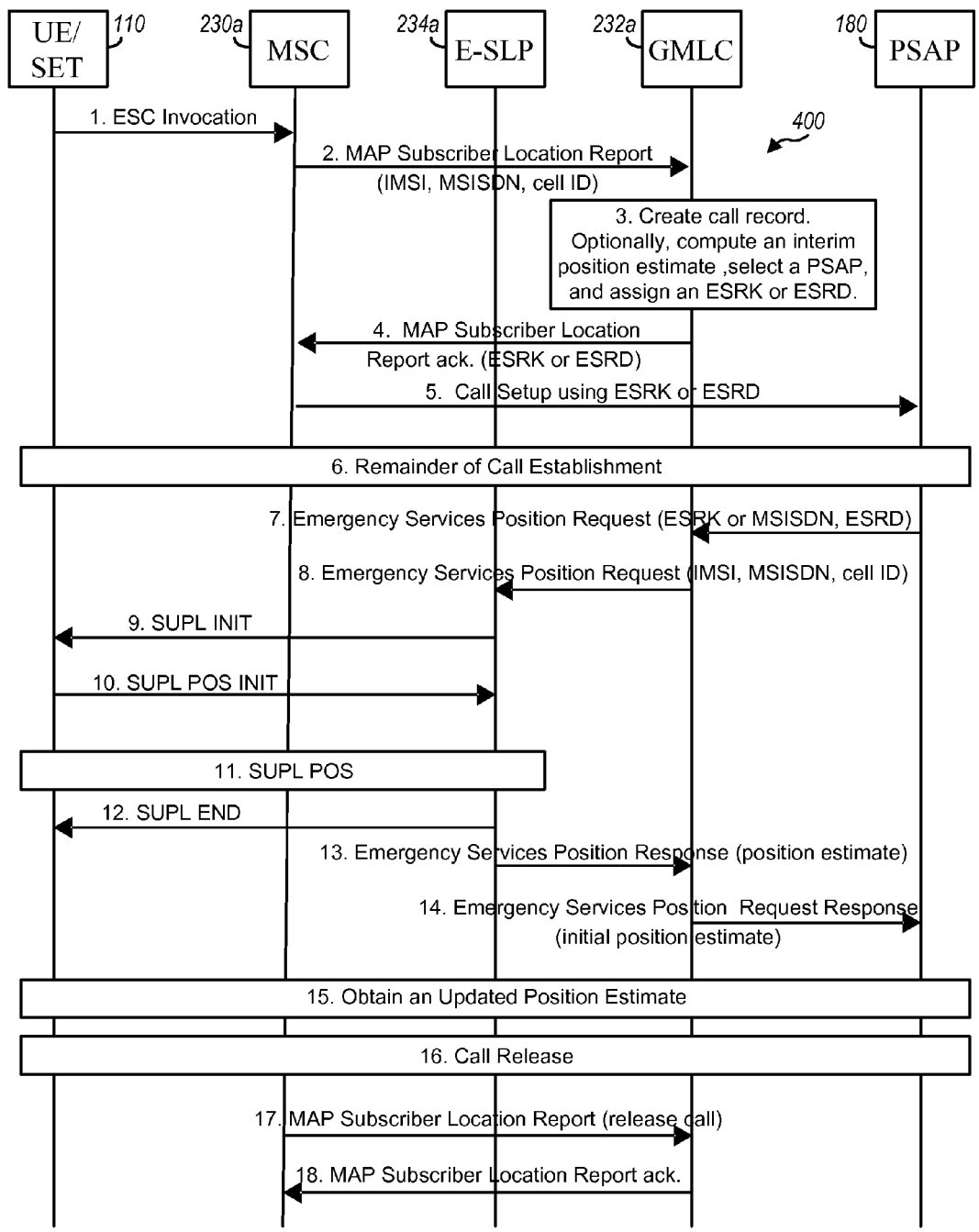
FIGS. 4, 5 and 6 show several message flows for emergency circuit-mode call with SUPL location.

FIG. 4 shows an embodiment of a message flow 400 for emergency circuit-mode call in 3GPP using SUPL with location instigated before call setup. In step 1, UE 110 sends a request for an emergency services call (e.g., E911 in North America or E112 in Europe) to MSC 230a in 3GPP V-PLMN 130a. This request is referred to as an emergency services call (ESC) invocation.

In step 2, MSC 230a may assume or determine that UE 110 supports SUPL positioning, e.g., based on UE subscription information or UE capability information received from the UE or as a policy of V-PLMN 130a. MSC 230a then sends a MAP Subscriber Location Report (SLR) message to GMLC 232a, which is in a network that has an association with (e.g., contains or is connected to) E-SLP 234a. The MAP SLR is used to create an emergency call record in GMLC 232a (and association with MSC 230a) and to obtain PSAP routing information from the GMLC. The MAP SLR may contain the UE identity, the serving cell identity (ID), and/or other information. The UE identity may be an International Mobile Subscriber Identity (IMSI), a Mobile Subscriber ISDN number (MSISDN), an International Mobile Equipment Identity (IMEI), and/or some other identity. The other information may include measurements from the UE or network, which may be used to compute a position estimate for the UE. For calls in North America, MSC 230a may assign an Emergency Services Routing Key (ESRK) or Emergency Services Routing Digits (ESRD) and would then include this in the MAP SLR. An ESRD is a non-dialable directory number that identifies a PSAP. An ESRK is a non-dialable directory number that may be used to route to a PSAP. Each PSAP may be associated with an ESRD and a pool of ESRKs. For an emergency call by a UE to this PSAP, one ESRK from the pool may be assigned to the UE for the duration of the emergency call and may be used to identify the PSAP, the GMLC and/or MSC, and the UE.

In step 3, GMLC 232a creates a record for the call. GMLC 232a may determine an interim position estimate for UE 110 based on location information received in step 2. The location information may comprise cell ID, measurements, position estimate, and so on. An interim position estimate typically refers to an approximate position used for routing a call. GMLC 232a may also initiate steps 8 to 13 in advance to obtain an interim position estimate for UE 110. GMLC 232a may select a PSAP based on an interim position estimate (if obtained) or the serving cell ID received in step 2. This ensures that the selected PSAP covers emergency calls from the geographic area where UE 110 is located. For calls in North America, GMLC 232a may assign an ESRD or ESRK to indicate the selected PSAP. In the following description, PSAP 180 is the selected PSAP. GMLC 232a may also initiate steps 8 to 13 in advance to obtain an accurate initial position estimate that may be used later for a location request from the PSAP. An initial position estimate typically refers to the first accurate position estimate. In step 4, GMLC 232a returns a MAP SLR acknowledgement to MSC 230a. For calls in North America, this acknowledgement may contain any ESRD or ESRK assigned by GMLC 232a in step 3.

In step 5, MSC 230a sends the emergency circuit-mode call to PSAP 180. For calls in North America, if an ESRK or ESRD was returned in step 4, then PSAP 180 is chosen by GMLC 232a in step 3. Otherwise, MSC 230a may determine the PSAP, e.g., based on the current or initial serving cell for UE 110. For calls in North America, the call setup message or indication sent by MSC 230a to PSAP 180 includes any ESRD or ESRK returned by GMLC 232a in step 4 or assigned by MSC 230a in step 2 or 5. The call setup message may also include a callback number for UE 110 (e.g., the MSISDN).

In step 6, the call is established between UE 110 and PSAP 180 via MSC 230a. In step 7, PSAP 180 sends an Emergency Services Position Request to GMLC 232a to request an accurate initial position estimate for UE 110. For calls in North America, PSAP 180 may identify GMLC 232a using the ESRK or ESRD received in step 5. In that case, the Emergency Services Position Request includes the ESRK and/or ESRD and a callback number. PSAP 180 does not need to be aware that SUPL is used for location.

In step 8, GMLC 232a identifies the call record created in step 3 using (a) the ESRK or callback number received in step 7 for calls in North America or (b) other caller information (e.g., the MSISDN or IMSI) for calls elsewhere. If GMLC 232a obtained an accurate position estimate in step 3 (e.g., by performing steps 8 to 13 in advance), then GMLC 232a may return this position estimate immediately to PSAP 180 in step 14 and skip steps 8 to 13. Otherwise, GMLC 232a sends to E-SLP 234a an Emergency Services Position Request that may contain the UE identity (e.g., the MSISDN and/or IMSI), the cell ID (if known), the required quality of position (QoP), and/or other information. The QoP conveys the requirements for a position estimate, e.g., the accuracy and age of the position estimate. QoP is also referred to as QoS.

In step 9, E-SLP 234a determines if positioning should be supported by a V-SLP closer and/or better able to support positioning for UE 110, e.g., based on the cell ID (if any) received in step 8. If so, then E-SLP 234a exchanges signaling with the V-SLP (not shown in FIG. 4). Otherwise, E-SLP 234a instigates a network initiated SUPL location procedure, with the E-SLP replacing the H-SLP. E-SLP 234a first sends a SUPL INIT to UE 110 to start the SUPL location procedure. The SUPL INIT may be sent using, e.g., Wireless Application Protocol (WAP) push, Short Message Service (SMS) trigger, or UDP/IP if E-SLP 234a knows or can obtain the IP address of UE 110. The SUPL INIT may include an IP address of E-SLP 234a, e.g., if UE 110 is not in its home network, if E-SLP 234a is not the H-SLP for the UE, or if E-SLP 234a chooses not to behave as the H-SLP (e.g., to simplify implementation). The SUPL INIT may also include an emergency services indication, e.g., in a SUPL INIT notification parameter. If non-proxy mode is used, then the SUPL INIT may also contain an IP address of an SPC that is associated with either E-SLP 234a or a separate V-SLP. UE 110 would then interact with this SPC to perform positioning.

In step 10, UE 110 establishes a secure IP connection to its H-SLP if E-SLP 234a is the H-SLP (and chooses to behave as the H-SLP) for the UE. However, if E-SLP 234a is not the H-SLP for UE 110 and/or if E-SLP 234a includes its IP address in the SUPL INIT in step 9, then UE 110 establishes an IP connection or a secure IP connection to E-SLP 234a instead of the H-SLP. For non-proxy mode, authentication related SUPL messages may then be exchanged between UE 110 and E-SLP 234a and between E-SLP 234a and any V-SLP chosen in step 9 (not shown in FIG. 4), and UE 110 then establishes an IP connection or a secure IP connection to the SPC indicated by the SUPL INIT in step 9. For proxy mode, UE 110 returns a SUPL POS INIT to E-SLP 234a. For non-proxy mode, UE 110 sends a SUPL POS INIT to the SPC (not shown in FIG. 4). The SUPL POS INIT may include the positioning methods and positioning protocols supported by UE 110, the serving cell ID, network measurements to assist with location computation, a request for assistance data (e.g., for A-GPS) if UE 110 needs assistance data, a position estimate if UE 110 already has one, and/or other information. If E-SLP 234a or the SPC is able to obtain a position estimate with the required accuracy from the information received in the SUPL POS INIT, then the E-SLP or SPC may proceed directly to step 12.

In step 11, UE 110 continues the SUPL location procedure with E-SLP 234a for proxy mode or with the SPC for non-proxy mode. UE 110 may exchange one or more SUPL POS messages with E-SLP 234a (for proxy mode) or the SPC (for non-proxy mode). Each SUPL POS message may contain a positioning message according to 3GPP Radio Resource LCS Protocol (RRLP), 3GPP Radio Resource Control (RRC), or some other positioning protocols. E-SLP 234a or the SPC may provide assistance data to UE 110 in these messages, and UE 110 may later return location related measurements or a position estimate.

In step 12, E-SLP 234a or the SPC obtains a position estimate either by computing this from measurements received from UE 110 in step 11 or by verifying a position estimate received from the UE in step 11. E-SLP 234a or the SPC then sends a SUPL END to UE 110 to terminate the SUPL location procedure. In step 13, E-SLP 234a returns the position estimate (which may have been forwarded from the selected V-SLP, not shown in FIG. 4) to GMLC 232a in an Emergency Services Position Response. In step 14, GMLC 232a returns the position estimate to PSAP 180 in an Emergency Services Position Request Response.

In step 15, at some later time, PSAP 180 may send another Emergency Services Position Request to GMLC 232a to obtain an updated position estimate for UE 110. In that case, GMLC 232a may repeat steps 8 to 13 to obtain a new position estimate using SUPL and return it to PSAP 180 in an Emergency Services Position Request Response. When requesting a position estimate from E-SLP 234a in a repetition of step 8, GMLC 232a may transfer the last obtained position estimate to E-SLP 234a to assist it in determining a V-SLP if this option is supported.

In step 16, at some later time, the call between UE 110 and PSAP 180 is released. In step 17, MSC 230a sends to GMLC 232a a MAP Subscriber Location Report identifying UE 110 (e.g., via the IMSI or MSISDN) and indicating that the call was released. In step 18, GMLC 232a may delete the call record created in step 3 and return a MAP Subscriber Location Report acknowledgment to MSC 230a.

Figure 5:
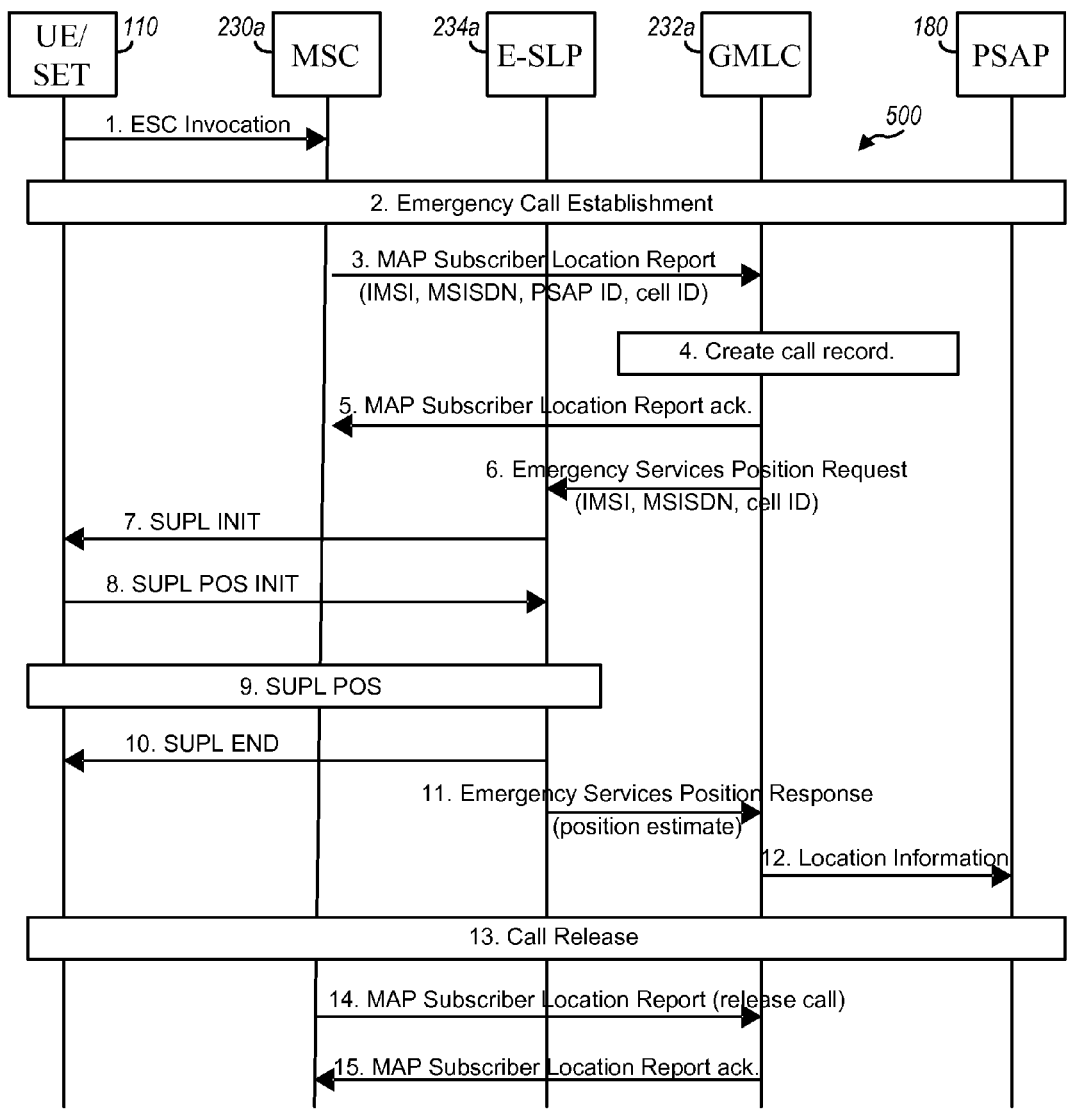

FIG. 5 shows an embodiment of a message flow 500 for emergency circuit-mode call in 3GPP using SUPL with location instigated after call setup. In step 1, UE 110 sends a request for an emergency services call to MSC 230a. In step 2, the emergency call procedure is applied. MSC 230a determines an appropriate PSAP (or emergency services client) based on the serving cell ID. In the following description, PSAP 180 is the selected PSAP. MSC 230a, RAN 120a, and UE 110 continue the normal procedure for emergency call origination towards PSAP 180. The call setup information sent to PSAP 180 (e.g., via PSTN 160) may include the UE location (if already obtained), information that will enable the emergency services provider to request the UE location at a later time (e.g., an ISUP/BICC IAM message with a location number parameter set to an MSC number and a calling party parameter set to the MSISDN in Europe), and/or other information.

In step 3, MSC 230a may assume or determine that UE 110 supports SUPL location. MSC 230a then sends a MAP SLR to GMLC 232a, which is associated with E-SLP 234a and PSAP 180 to which the emergency call has been or will be sent in step 3. The MAP SLR may contain the UE identity, the serving cell ID, Service Area Identifier (SAI) of the UE, and/or other information. In case of a SIM-less emergency call or a non-registered (U)SIM emergency call, the IMEI may always be sent and the MSISDN may be populated with a non-dialable callback number. In Europe, MSC 230a may provide the identity of PSAP 180 to which the emergency call was connected.

In step 4, GMLC 232a creates a record for the call. In step 5, GMLC 232a returns a MAP SLR acknowledgement to MSC 230a. In step 6, GMLC 232a sends to E-SLP 234a an Emergency Services Position Request that may contain the UE identity (e.g., the MSISDN and/or IMSI), the cell ID or SAI (if known), the required QoP, and/or other information.

In steps 7 through 10, E-SLP 234a and UE 110 engage in a SUPL location procedure, as described above for steps 9 through 12 in FIG. 4. The need for a V-SLP may be determined from the cell ID or SAI (if any) received in step 6. In step 10, E-SLP 234a (for proxy mode) or an SPC associated with E-SLP 234a or the selected V-SLP (for non-proxy mode) obtains a position estimate for UE 110. E-SLP 234a or the SPC then sends a SUPL END to UE 110 to terminate the SUPL location procedure. In step 11, E-SLP 234a returns the position estimate (which may have been forwarded from the selected V-SLP, not shown in FIG. 5) to GMLC 232a. In step 12, GMLC 232a may forward the location information received in step 11, information about the positioning method used, and/or other information to PSAP 180. Otherwise, PSAP 180 is expected to obtain location information by requesting it from GMLC 232a.

In step 13, at some later time, the call between UE 110 and PSAP 180 is released. In step 14, MSC 230a sends to GMLC 232a a MAP Subscriber Location Report identifying UE 110 and indicating that the call was released. In step 15, GMLC 232a may delete the call record created in step 4 and return a MAP Subscriber Location Report acknowledgment to MSC 230a.

2. Emergency circuit-mode call in 3GPP2 with SUPL location

Figure 6:
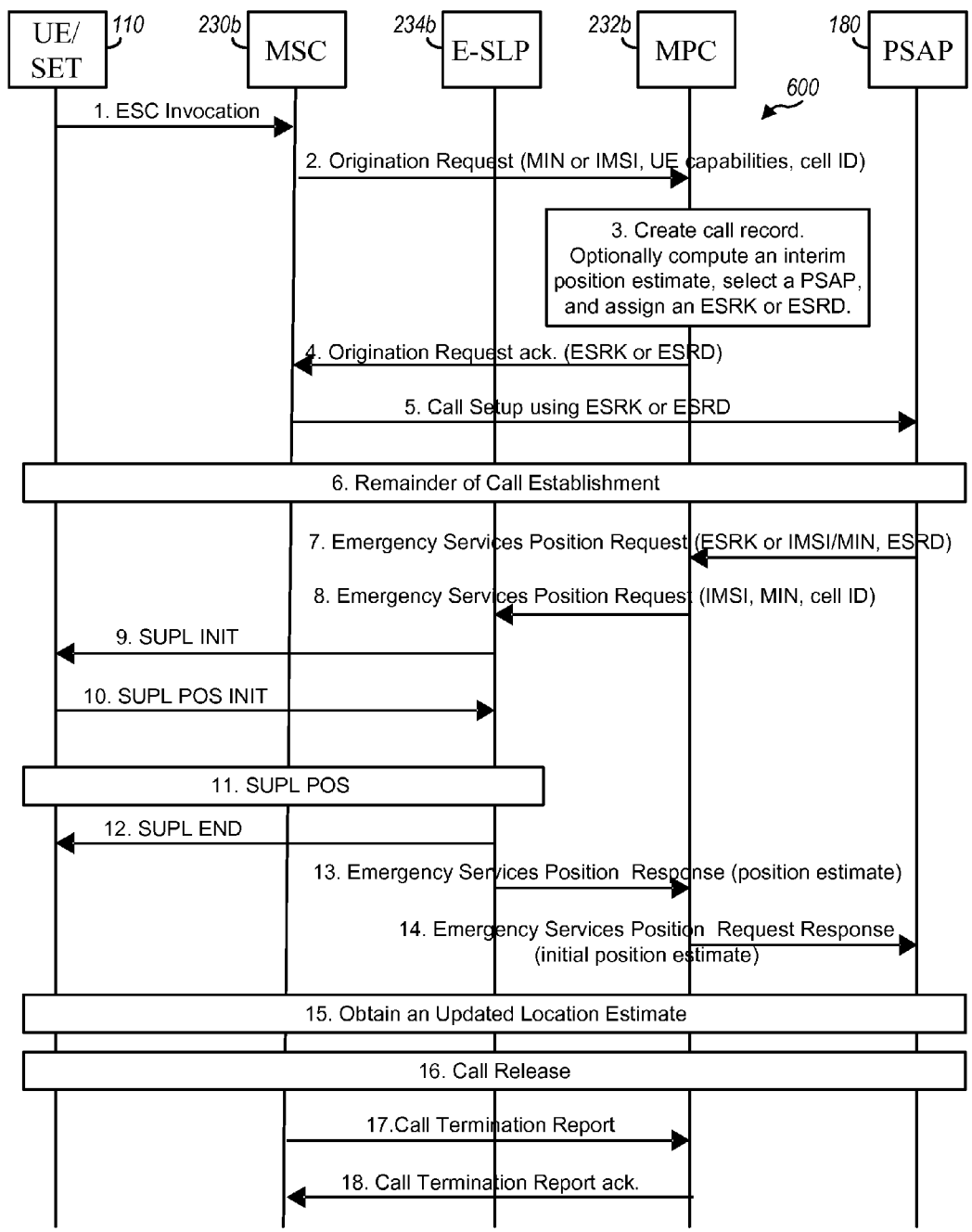

FIG. 6 shows an embodiment of a message flow 600 for emergency circuit-mode call in 3GPP2 using SUPL. In step 1, UE 110 sends a request for an emergency services call to MSC 230b in 3GPP2 PLMN 130b. In step 2, MSC 230b may assume or determine that UE 110 supports SUPL positioning, e.g., based on UE subscription information or UE capability information received from the UE or PLMN 130b policy. MSC 230b then sends an ANSI-41 MAP Origination Request to MPC 232b, which is in a network that has an association with (e.g., contains or is connected to) E-SLP 234b. The Origination Request may contain the UE identity (e.g., the IMSI and/or MIN), the serving cell ID, and/or other information (e.g., measurements from the UE or network that may be used to compute a position estimate).

In step 3, MPC 232b creates a record for the call. MPC 232b may determine an interim position estimate for UE 110 based on the cell ID and any measurements received in step 2. MPC 232b may also initiate steps 8 to 13 in advance and obtain an interim position estimate for UE 110. MPC 232b may select a PSAP based on an interim position estimate (if obtained) or the serving cell ID received in step 2. If so, MPC 232b may assign an ESRD or ESRK to indicate the selected PSAP. In the following description, PSAP 180 is the selected PSAP. In step 4, MPC 232b returns to MSC 230b an ANSI-41 MAP Origination Request acknowledgement containing any ESRD or ESRK assigned in step 3.

In step 5, MSC 230b sends the emergency services call to PSAP 180. If an ESRK or ESRD was returned in step 4, then PSAP 180 is chosen by MPC 232b in step 3. Otherwise, MSC 230b may determine the PSAP (e.g., based on the current or initial serving cell for UE 110) and may assign an ESRD and/or ESRK. The call setup message sent by MSC 230b to PSAP 180 may include any ESRD or ESRK returned in step 4 or assigned in step 5 and a callback number for UE 110 (e.g., the MSISDN).

In step 6, the call is established between UE 110 and PSAP 180 via MSC 230b. In step 7, PSAP 180 sends an Emergency Services Position Request to MPC 232b to request an accurate initial position estimate for UE 110. PSAP 180 may identify MPC 232b using the ESRK or ESRD received in step 5. In that case, the Emergency Services Position Request includes the ESRK and/or ESRD and a callback number. In step 8, MPC 232b identifies the call record created in step 3 using the ESRK or callback number received in step 7. If MPC 232b obtained an accurate position estimate in step 3 (e.g., by performing steps 8 to 13 in advance), then MPC 232b may return it immediately to PSAP 180 in step 14 and skip steps 8 to 13. Otherwise, MPC 232b sends to E-SLP 234b an Emergency Services Position Request that may contain the UE identity (e.g., the MIN and/or IMSI), the cell ID (if known), the required QoP, and/or other information.

In steps 9 through 12, E-SLP 234b and UE 110 engage in a SUPL location procedure, as described above for steps 9 through 12 in FIG. 4. If E-SLP 234b (for proxy mode) or an SPC (for non-proxy mode) is able to obtain a position estimate with the needed accuracy from the information received in a SUPL POS INIT in step 10, then the E-SLP or SPC may proceed immediately to step 12. Otherwise, UE 110 may exchange one or more SUPL POS messages with E-SLP 234b (for proxy mode) or the SPC (for non-proxy mode) in step 11. Each SUPL POS message may contain a positioning message according to 3GPP2 C.S0022, TIA-801, 3GPP RRLP, RRC, or some other positioning protocols. E-SLP 234b or the SPC may provide assistance data to the UE in these messages, and the UE may later return location related measurements or a position estimate. In step 12, E-SLP 234b or the SPC obtains a position estimate and sends a SUPL END to UE 110 to terminate the SUPL location procedure.

In step 13, E-SLP 234b returns the position estimate (which may have been forwarded from a selected V-SLP, not shown in FIG. 6) to MPC 232b. In step 14, MPC 232b returns the position estimate to PSAP 180 in an Emergency Services Position Request response message. In step 15, at some later time, PSAP 180 may send another Emergency Services Position Request to MPC 232b to obtain an updated position estimate for UE 110. In that case, MPC 232b may repeat steps 8 to 13 to obtain a new position estimate using SUPL and return it to PSAP 180 in an Emergency Services Position Request Response. When requesting a position estimate from E-SLP 234b in a repetition of step 8, MPC 232b may transfer the last obtained position estimate to E-SLP 234b to assist it in determining a V-SLP if this option is supported.

In step 16, at some later time, the call between UE 110 and PSAP 180 is released. In step 17, MSC 230b sends to MPC 232b an ANSI-41 MAP Call Termination Report message identifying UE 110 (e.g., via the IMSI or MSISDN) and indicating that the call was released. In step 18, MPC 232b may delete the call record created in step 3 and return an ANSI-41 MAP Call Termination Report acknowledgment to MSC 230b.

3. Emergency Circuit-Mode Call in 3GPP2 with X.S0024 Location

Figure 7:
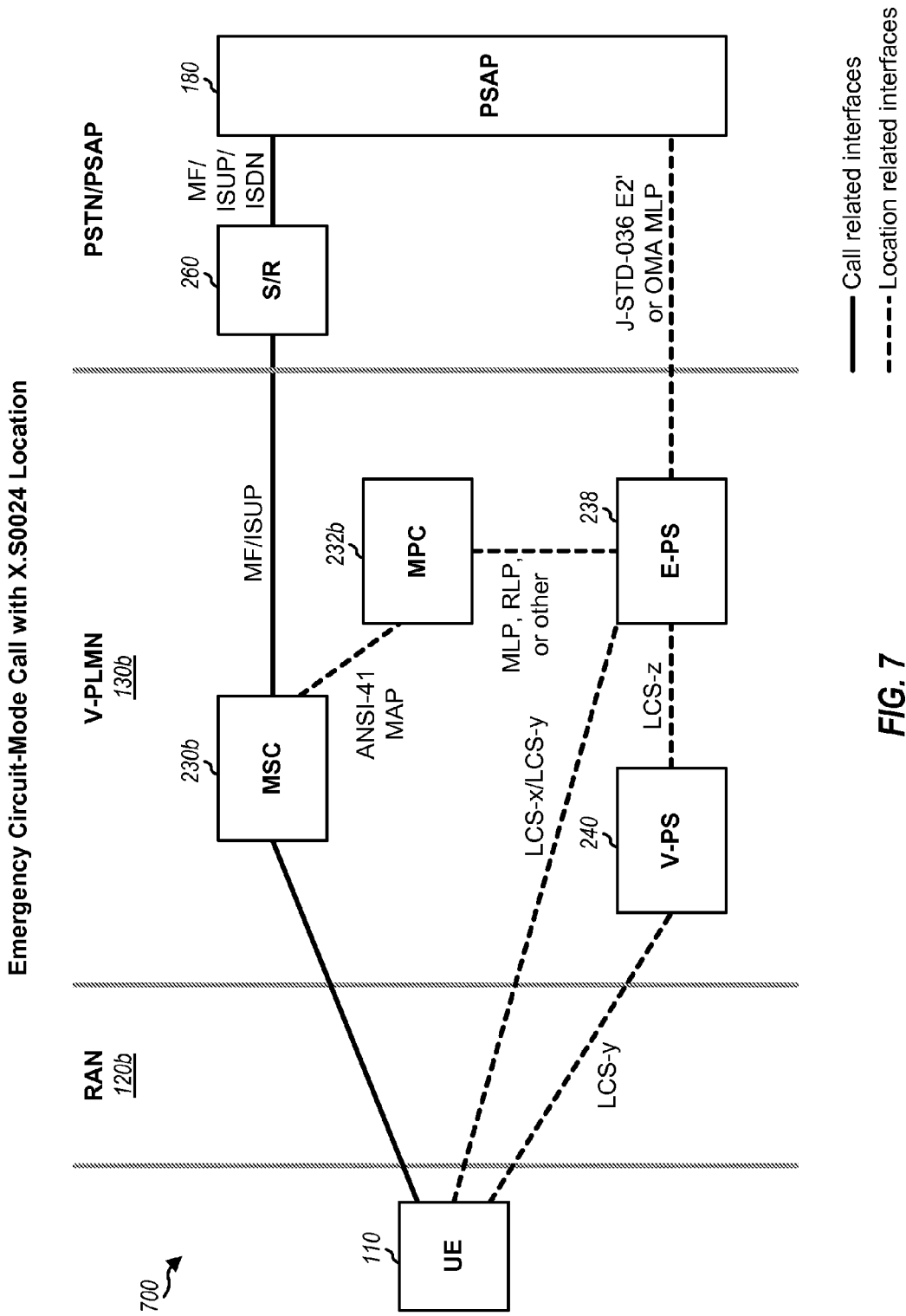
FIG. 7 shows a network architecture for X.S0024 location.

FIG. 7 shows an embodiment of a network architecture 700 for emergency circuit-mode call with X.S0024 location. For 3GPP2, a user plane location solution defined in 3GPP2 X.S0024 may be used instead of SUPL. Network architecture 700 is thus applicable for 3GPP2 networks. RAN 120 may be 3GPP2 RAN 120b or some other access network. V-PLMN 130b may include MSC 230b, MPC 232b, E-PS 238, and V-PS 240. MPC 232b may invoke E-PS 238 and use X.S0024 to determine the location of an emergency calling UE.

The location related interfaces between UE 110, E-PS 238 and V-PS 240 may be LCS-x, LCS-y, and LCS-z, as shown in FIG. 7, which are described in 3GPP2 X.S0024. The interface between MSC 230b and MPC 232b may be ANSI-41 MAP. The interface between MPC 232b and E-PS 238 may be MLP, RLP, or some other interface.

Figure 8:
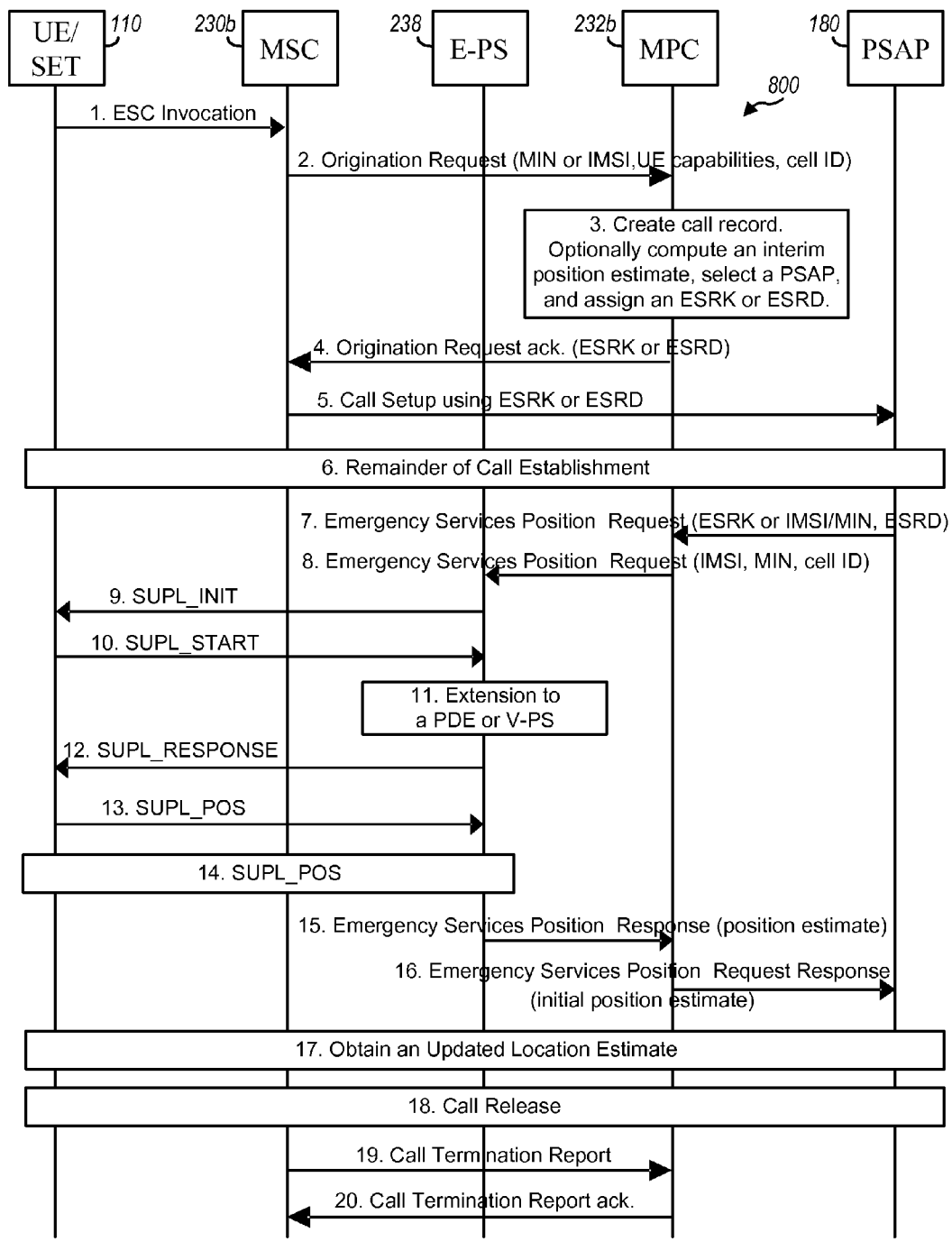
FIG. 8 shows a message flow for emergency circuit-mode call with X.S0024 location.

FIG. 8 shows an embodiment of a message flow 800 for emergency circuit-mode call in 3GPP2 using X.S0024. In step 1, UE 110 sends a request for an emergency services call to MSC 230b in 3GPP2 PLMN 130b. In step 2, MSC 230b may assume or determine that UE 110 supports X.S0024 positioning, e.g., based on UE subscription information or UE capability information received from the UE or PLMN 130b policy. MSC 230b then sends an ANSI-41 MAP Origination Request message to MPC 232b. The Origination Request may contain the UE identity (e.g., the IMSI and/or MIN), the serving cell ID, and/or other information (e.g., measurements from the UE or network that may be used to compute a position estimate).

In step 3, MPC 232b creates a record for the call. MPC 232b may determine an interim position estimate for UE 110 based on the cell ID and any measurements received in step 2. MPC 232b may also initiate steps 8 to 15 in advance and obtain an interim position estimate for UE 110. MPC 232b may select a PSAP based on an interim position estimate (if obtained) or the serving cell ID received in step 2. If so, MPC 232b may assign an ESRD or ESRK to indicate the selected PSAP. In the following description, PSAP 180 is the selected PSAP. In step 4, MPC 232b returns to MSC 230b an ANSI-41 MAP Origination Request acknowledgement containing any ESRD or ESRK assigned in step 3. In step 5, MSC 230b sends the emergency services call to PSAP 180. If an ESRK or ESRD was returned in step 4, then PSAP 180 is chosen by MPC 232b in step 3. Otherwise, MSC 230b may determine the PSAP (e.g., based on the current or initial serving cell for UE 110) and may assign an ESRD and/or ESRK. The call setup message sent by MSC 230b to PSAP 180 may include any ESRD or ESRK returned in step 4 or assigned in step 5 and a callback number for UE 110 (e.g., a Mobile Directory Number, MDN). MSC 230b may send the call to PSAP 180 before step 2 to avoid delaying the call.

In step 6, the call is established between UE 110 and PSAP 180 via MSC 230b. In step 7, PSAP 180 sends an Emergency Services Position Request to MPC 232b to request an accurate initial position estimate for UE 110. PSAP 180 may identify MPC 232b using the ESRK or ESRD received in step 5. In that case, the Emergency Services Position Request includes the ESRK and/or ESRD and a callback number. In step 8, MPC 232b identifies the call record created in step 3 using the ESRK or callback number received in step 7. If MPC 232b obtained an accurate position estimate in step 3, then MPC 232b may return it immediately to PSAP 180 in step 16 and skip steps 8 to 15. Otherwise, MPC 232b sends to E-PS 238 an Emergency Services Position Request that may contain the UE identity (e.g., the MIN and/or IMSI), the cell ID (if known), the required QoP, and/or other information.

In step 9, E-PS 238 instigates an X.S0024 location procedure and sends an X.S0024 SUPL_INIT to UE 110 using SMS, WAP push, or UDP/IP if E-PS 238 knows or can obtain the IP address of UE 10. The SUPL_INIT may include the required QoP, the supported positioning methods, an IP address of E-PS 238, e.g., if UE 110 is not in its home network, if E-PS 238 is not the H-PS for the UE, or if E-PS 238 chooses not to behave as the H-PS. The SUPL_INIT may also include an emergency services indication, e.g., in a SUPL_INIT notification parameter. The Emergency Services Position Request in step 8 may be sent immediately after step 4 without waiting for the Emergency Services Position Request from PSAP 180 in step 7. In that case, steps 8 through 15 may be completed before MPC 232b receives the Emergency Services Position Request from PSAP 180 in step 7, and MPC 232b may proceed directly from step 7 to step 16.

In step 10, UE 110 establishes a secure IP connection to E-PS 238 if it is the H-PS for the UE. However, if E-PS 238 is not the H-PS for UE 110 or if E-PS 238 includes its IP address in the SUPL_INIT in step 9, then UE 110 establishes an IP connection or a secure IP connection to E-PS 238 instead of the H-PS. UE 110 then sends to E-PS 238 a SUPL_START that may include the positioning methods and capabilities supported by UE 110, the serving cell ID, measurements, a position estimate, a request for assistance data, and/or other information.

In step 11, E-PS 238 may extend the positioning procedure to a selected PDE, which may be a PDE associated with E-PS 238 or a V-PS. The selected PDE would then manage the positioning procedure and assist with position computation. The extension may use either (a) proxy mode in which UE 110 communicates with the selected PDE via E-PS 238 (as shown in FIG. 8) or (b) non-proxy mode in which UE 110 communicates directly with the selected PDE (not shown in FIG. 8).

In step 12, E-PS 238 sends a SUPL_RESPONSE to UE 110. For proxy mode, in step 13, UE 110 sends to E-PS 238 a SUPL_POS that may carry serving cell information, an embedded positioning message (e.g., using the 3GPP2 C.S0022 or TIA-801 protocol), and/or other information. E-PS 238 then forwards the SUPL_POS to the selected PDE (not shown in FIG. 8). For non-proxy mode, the SUPL_RESPONSE in step 12 carries the address of the selected PDE, and UE 110 establishes a secure IP connection to the selected PDE and sends the SUPL_POS directly to this PDE in step 13.

In step 14, UE 110 may exchange additional SUPL_POS messages with E-PS 238 (for proxy mode) or the PDE (for the non proxy mode). E-PS 238 or the PDE may provide assistance data to UE 110 in these messages, and the UE may provide location measurements (e.g., A-GPS and/or A-FLT measurements) or a position estimate to the E-PS or PDE. In step 15, the selected PDE obtains a position estimate either by computing this from measurements received from UE 110 in steps 13 and 14 or by verifying a position estimate received from the UE. The PDE then returns the position estimate to E-PS 238 either directly if the PDE is associated with E-PS 238 or indirectly (not shown in FIG. 8) if the PDE is associated with a V-PS. E-PS 238 then forwards the position estimate to MPC 232*b* in an Emergency Services Position Response. In step 16, MPC 232*b* returns the position estimate to PSAP 180 in an Emergency Services Position Request Response.

In step 17, at some later time, PSAP 180 may send another Emergency Services Position Request to MPC 232*b* to obtain an updated position estimate for UE 110. In that case, the MPC 232*b* may repeat steps 8 to 15 to obtain a new position estimate using X.S0024 and return it to PSAP 180 in an Emergency Services Position Request Response. In step 18, at some later time, the call between UE 110 and PSAP 180 is released. In step 19, MSC 230*b* sends to MPC 232*b* an ANSI-41 MAP Call Termination Report message identifying UE 110 (e.g., via the IMSI or MIN) and indicating that the call was released. In step 20, MPC 232*b* may delete the call record created in step 3 and return an ANSI-41 MAP Call Termination Report acknowledgment to MSC 230*b*.

4. Use of SUPL 1.0 or X.S0024 Version 1.0

V-PLMN 130 may not, or may not always, employ an E-SLP or E-PS to support SUPL or X.S0024 location on behalf of emergency circuit-mode calls. Instead, V-PLMN 130 may employ an earlier version of OMA SUPL (e.g., SUPL 1.0) or an earlier version of X.S0024, both of which do not have special location support for emergency calls. This may be an advantage to a network operator who has not yet deployed a version of SUPL or X.S0024 containing special location support for emergency calls that enables use of an E-SLP or E-PS as described above. It may also be an advantage if a network operator wishes to support circuit-mode emergency calls for UEs that only support an earlier version of SUPL or X.S0024 (e.g., even though the network operator may support a later version of SUPL or X.S0024).

In an embodiment, V-PLMN 130 may employ a Requesting SLP (R-SLP) rather than an E-SLP that is associated or combined with GMLC 232*a* or MPC 232*b*. In this case, support of an emergency circuit-mode call may still occur as described above in FIGS. 4, 5 and 6 but with the following differences. First, the R-SLP would replace E-SLP 234*a* or E-SLP 234*b* in each figure. Second, the R-SLP would receive position requests from GMLC 232*a* or MPC 232*b* in step 8 in FIGS. 4 and 6 and in step 6 in FIG. 5. The R-SLP would return the obtained UE position to GMLC 232*a* or MPC 232*b* in step 13 in FIGS. 4 and 6 and in step 11 in FIG. 5. Third, the SUPL location procedure described for steps 9 to 12 in FIGS. 4 and 6 and for steps 7 to 10 in FIG. 5 would be replaced by an alternative SUPL location procedure in which the R-SLP first requests location from the H-SLP for UE 110. The H-SLP would then interact with UE 110 using SUPL to obtain the UE location and would return the UE location to the R-SLP. This alternative SUPL location procedure is defined in OMA-AD-SUPL-V1_0-20060906-C, entitled "Secure User Plane Location Architecture Candidate Version 1.0," Sep. 6, 2006, which is publicly available.

If V-PLMN 130 is H-PLMN 150 for UE 110, then the R-SLP may be the H-SLP for UE 110 and the modified procedure described above may be used but without the need for any location request and response between the R-SLP and H-SLP, since these are now the same entity.

In the case of X.S0024, this embodiment may be used in a similar manner but with a Requesting PS (R-PS) replacing E-PS 238 associated or combined with MPC 232*b* in V-PLMN 130*b*. In this case, the location procedure described in steps 9 to 14 in FIG. 8 would be replaced by a procedure in which the R-PS requests the location of UE 110 from the H-PS of UE 110, and the H-PS then interacts with UE 110 to obtain location (and returns it to the R-PS) as described in X.S0024, "IP Based Location Services," Version 1.0, Revision 0, October 2005. As with SUPL, if UE 110 is in its H-PLMN, then the R-PS may be the H-PS.

5. Support of Unregistered, UICC-less, SIM-less and UIM-less UEs

To initiate SUPL location (e.g., in step 9 of FIGS. 4 and 6 and step 7 of FIG. 5), the E-SLP sends a SUPL INIT to the UE using WAP push, SMS, UDP/IP, or some other means. To initiate X.S0024 location (e.g., in step 9 of FIG. 8), the E-PS sends a SUPL_INIT to the UE using WAP push, SMS, UDP/IP, or some other means. The sending of the SUPL INIT in some cases (e.g., using WAP Push or SMS) may be awkward and time consuming if the UE is roaming from its H-PLMN and may also be unreliable due to interworking with the H-PLMN. In an embodiment, the E-SLP or E-PS sends an SMS message directly to a serving MSC and emulates an SMS gateway MSC in 3GPP or an SMS Message Center in 3GPP2.

In another embodiment, the E-SLP or E-PS sends the SMS message via the GMLC or MPC to the serving MSC in order to reduce the impact to the E-SLP or E-PS. These embodiments may also be used for an unregistered UE, a UICC-less UE in 3GPP, a SIM-less UE in GSM, and a UIM-less UE in 3GPP2. In this case, the MSC may provide the GMLC or MPC with a temporary UE identifier to replace the normal IMSI, MSISDN or MIN. The temporary UE identifier may be included in the MAP Subscriber Location Report sent in step 2 of FIG. 4 and step 3 of FIG. 5 for 3GPP and in the ANSI-41 Origination Request sent in step 2 of FIGS. 6 and 8 for 3GPP2. Once the UE receives the SUPL INIT, it can establish an IP connection or a secure IP connection to the E-SLP or E-PS. An unregistered, UICC-less, SIM-less or UIM-less UE may establish IP connectivity with restricted access for an emergency call, which would enable an IP connection to an E-SLP or E-PS in the same network. IP connectivity may be established, e.g., using the procedures described for "VoIP Emergency Call Support" in 3GPP SA2 contribution S2-051950, which is publicly available. In this case, a separate V-SLP might not be used.

Much of the description above assumes that the UE supports simultaneous circuit-mode call (for voice) and packet-mode data transfer (for location). If the UE or the network does not support simultaneous circuit-mode and packet-mode communication, then signaling between the UE and the E-SLP or E-PS may be supported in other manners.

Figure 9:
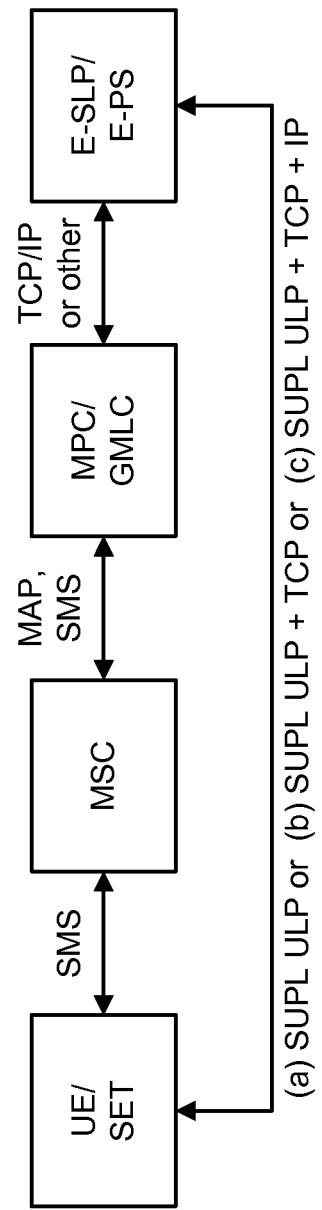
FIG. 9 shows communication protocols between various entities.

FIG. 9 shows several embodiments of communication among the various entities. In an embodiment, SMS is used for all SUPL communication. With SMS, signaling and information for location (e.g., SUPL messages) are sent inside SMS messages that are conveyed between the MPC/GMLC and the MSC and between the MSC and the UE using existing SMS point-to-point transport protocols (e.g., SMS MAP messages) in 3GPP and 3GPP2. SMS signaling may be sent directly between the MSC and the GMLC or MPC. Between the E-SLP and the GMLC or MPC, the SUPL messages may be transported using TCP/IP, e.g., with the same TCP/IP connection used for the Emergency Services Position Request and Response exchange or with a different connection.

In an embodiment, which is labeled as (a) in FIG. 9, SUPL ULP (but not TCP or IP) is used end-to-end between the UE and the E-SLP or E-PS. In another embodiment, which is labeled as (b) in FIG. 9, SUPL ULP is conveyed using an end-to-end TCP connection. In yet another embodiment, which is labeled as (c) in FIG. 9, SUPL ULP is conveyed using end-to-end TCP/IP, with some protocol duplication en route. This capability may be supported by special SMS handling in the MSC for SMS messages sent from the UE. For example, the MSC may assume that any SMS message sent by the UE during an emergency call in which SUPL is used is intended for SUPL and would then send the SMS message to the GMLC or MPC.

6. Security

For SUPL, security procedures may be established to support the E-SLP in the visited network replacing the H-SLP for location for both roaming and non-roaming scenarios and with proxy or non-proxy mode. Existing SUPL security procedures are generally based on shared keys in both the UE and the H-SLP and/or based on other information provisioned in the UE concerning the H-SLP (e.g., fully qualified domain name, root X.509 public key certificate, etc.). Such information may not be available to the E-SLP unless the UE happens to be in the home network. For the E-SLP, authentication for proxy and non-proxy modes may be supported as described below.

For X.S0024, security procedures may also be established to support the E-PS replacing the H-PS for location. Existing X.S0024 security procedures are described in 3GPP2 X.S0024-0 and 3GPP2 S.P0110-0. These procedures make use of a common root key provisioned in both the H-PS for a user and in the user's UIM. Additional keys may be derived from the provisioned root key as follows:

(a) Key to support Secure Store and Forward Encapsulation (S-SAFE) in which a SUPL INIT is sent to the UE using SMS or WAP Push and is authenticated (as coming from the H-PS) and optionally ciphered.

(b) Key to support a secure IP connection between the UE and the H-PS in which X.S0024 messages are sent between the UE and the H-PS with ciphering and authentication.

(c) Key to support a secure IP connection between the UE and a PDE for non-proxy mode in which X.S0024 messages are sent between the UE and the PDE with ciphering and authentication.

Each of the three keys described above is fixed in the sense that there is a deterministic value for any value of the root key. However, from each of these fixed keys, additional keys may be derived for ciphering and authentication whose values depend on random numbers provided for a particular positioning session by the UE and the H-PS or PDE. This key derivation and the accompanying security procedures make use of the Transport Layer Security (TLS) procedure described in IETF RFC 2246 and a PSK-TLS variant of this described in IETF draft "Pre-Shared Key Ciphersuites for Transport Layer Security (TLS)". If X.S0024 is used for positioning in an emergency circuit-mode call and the E-PS is not the H-PS, then it is no longer possible to rely on a common pre-configured root key in both the UE and the E-PS for mutual authentication and ciphering.

For SUPL, the UE may authenticate the E-SLP to avoid unauthorized access to UE location even during an emergency call. For X.S0024, the UE and the E-PS may perform mutual authentication. Table 1 lists five authentication methods, designated as methods A, B, C, D and E, and the characteristics of each method.

TABLE 1

| | Authentication Methods | | | | |
|---|---|---|---|---|---|
| Characteristic | Method A | Method B | Method C | Method D | Method E |
| Authenticate E-SLP or E-PS | No | Yes | Yes | Yes | Yes |
| Authenticate UE | No | Limited | Yes | Yes | Yes |
| Support roaming | Yes | Yes | Yes | Yes | No |
| H-PLMN impact | No | No | No | Yes | Yes |
| Secure UE connection to V-PLMN needed | No | No | Yes | No | No |
| UICC/UIM-less support | Yes | Yes (note 1) | Limited | No | No |

Note 1:
assumes that public key root certificates are provisioned in a Mobile Equipment (ME)

Method A provides minimal authentication. The UE allows network initiated SUPL or X.S0024 location from a non-authenticated E-SLP or E-PS if the SUPL INIT indicates location for an emergency session and the UE is currently engaged in an emergency session. The restriction to emergency session provides some protection. In addition, the transfer of the SUPL INIT via SMS or WAP Push may provide additional confidence in the UE authenticity, since SMS or WAP transfer relies on support and verification from the V-PLMN and/or H-PLMN. The UE may select method A by not invoking security procedures with the E-SLP or E-PS. In this case, for SUPL, the E-SLP can verify the UE, to a limited extent, through a SUPL INIT hash code contained in the SUPL POS INIT.

Method B is for TLS public key authentication. The UE and the E-SLP or E-PS support public key authentication using TLS as described in IETF RFC 2246 and as also described for an alternative client authentication mechanism in OMA SUPL 1.0, entitled "Secure User Plane Location Architecture". This mechanism supports authentication of the E-SLP or E-PS by the UE using TLS with ITU X.509 public key certificates sent by the E-SLP or E-PS to the UE during a TLS handshake phase. The public key certificates provide a chain of digital signatures, each signature authenticating the next, such that the UE can authenticate the public key of the E-SLP or E-PS provided the UE is provisioned with the public key of at least one root certification authority. The public key authentication TLS procedure supports transfer of symmetric keys for use in subsequent ciphering and authentication of signaling, e.g., for subsequent SUPL or X.S0024 messages. Authentication and ciphering between the UE and an SPC or PDE for non-proxy mode may also be supported with these keys or by deriving additional keys from these keys.

Method B relies on certification of the E-SLP or E-PS public key certificate by one or more root certification authorities (e.g., defined by OMA) and provisioning of the certificate in UEs supporting SUPL or X.S0024 for emergency calls. The UE recognizes the E-SLP or E-PS name in the certificate, e.g., using a fully qualified domain name for the E-SLP or E-PS or an MCC-MNC identification that the UE can match with information already known about the serving network. This ensures authentication of the E-SLP or E-PS by the UE and, for SUPL, limited authentication of the UE by the E-SLP via a 64-bit SUPL INIT hash included in the SUPL POS INIT and sent by the UE to the E-SLP.

For method B, the UE (e.g., UICC or UIM) may be provisioned with one or more root public key certificates enabling the UE to verify the public key(s) of the E-SLP or E-PS. The UE and the E-SLP or E-PS may establish a shared ciphering key and a message authentication code (MAC) key using TLS procedures described in RFC 2246 and one or more secure public key transfer procedures, e.g., RSA, DSS, or Diffie-Hellman. Ciphering and authentication of SUPL or X.S0024 messages may be performed after establishment of a secure TLS connection. For non-proxy mode, the method defined for 3GPP2 non-proxy mode in SUPL 1.0 may be used to generate a shared key for authentication and ciphering, according to IETF PSK-TLS, between the UE and an SPC in SUPL or between the UE and a PDE in X.S0024.

Method C is for PSK-TLS authentication. The UE and the E-SLP or E-PS support PSK-TLS (e.g., as described in SUPL 1.0 for 3GPP2 SETs or 3GPP2 X.S0024-0 and S.P0110-0) according to IETF draft "Pre-Shared Key Ciphersuites for Transport Layer Security (TLS)". A pre-shared key (PSK) may be generated from (a) information (e.g., random information) contributed by the UE, the network (e.g., MSC or HLR) and/or the E-SLP or E-PS, (b) information (e.g., parameters) sent by or to the UE during establishment of the emergency call, (c) security information (e.g., the ciphering key) already present in the MSC and the UE to support secure circuit-mode access from the UE, and/or (d) other information. The security information in (c) may be available if the UE registers with the V-PLMN.

The PSK or the information used to derive it may be made available to the UE and the E-SLP (or MPC or GMLC) or E-PS (or MPC) during emergency call establishment. The trust relationship established during call setup between these entities is used to obtain a secure PSK or common information from which a secure key may be derived. The UE and the E-SLP may then employ PSK-TLS for SUPL location using the derived PSK(s). The PSK(s) may be used to obtain additional PSKs for authentication for non-proxy mode. For SUPL, mutual authentication of the UE and the E-SLP may be supported using PSK-TLS when the UE establishes an IP (PSK-TLS) connection to the E-SLP following transfer of the SUPL INIT from the E-SLP to the UE. For X.S0024, the secure PSK may be used as a root key from which remaining security information may be derived as described in 3GPP2 X.S0024-0 and S.P0110-0.

Method C relies on a secure connection between the UE and the V-PLMN during emergency call setup, which implies registration of the UE in the V-PLMN and mutual authentication of the UE and the V-PLMN. If the UE does not have an UICC/UIJM or if there is no roaming agreement between the V-PLMN and H-PLMN, mutual authentication of and secure transmission between the V-PLMN and the UE may not be achieved during emergency call setup, and any PSK generated will provide more limited protection.

Method D is for authentication with a Generic Bootstrap Architecture (GBA) described in 3GPP TS 33.220 or 3GPP2 TSG-S draft S.P0109. The UE and the E-SLP or E-PS support GBA. This enables the UE and the E-SLP or E-PS to obtain a secure shared key from the H-PLMN. For SUPL, this key may be used to support PSK-TLS mutual authentication between the UE and the E-SLP, as described in 3GPP TS 33.222 or 3GPP2 TSG-S draft S.P0114. This method is used in SUPL 1.0 to support 3GPP proxy mode. The key may also be used to support TLS with HTTP Digest authentication (e.g., as described in 3GPP TS 33.222), just HTTP Digest authentication between the UE and the E-SLP (e.g., as described in 3GPP2 TSG-S draft S.P0114), or other forms of authentication. For X.S0024, this key may be used as a root key from which remaining security information may be derived.

Method D relies on support of GBA in the H-PLMN and V-PLMN and roaming agreement between the H-PLMN and V-PLMN to enable transfer of key information from a Bootstrapping Serving Function (BSF) in the H-PLMN to an E-SLP Network Application Function (NAF) in the V-PLMN.

Method E is for SUPL 1.0 or X.S0024 authentication. For SUPL, if the UE is in the H-PLMN, then the E-SLP may be the H-SLP, and existing authentication mechanisms defined in SUPL 1.0 may be used. For X.S0024, if the UE is in the H-PLMN, then the E-PS may be the H-PS, and existing authentication mechanisms defined in X.S0024 may be used.

Figure 10:
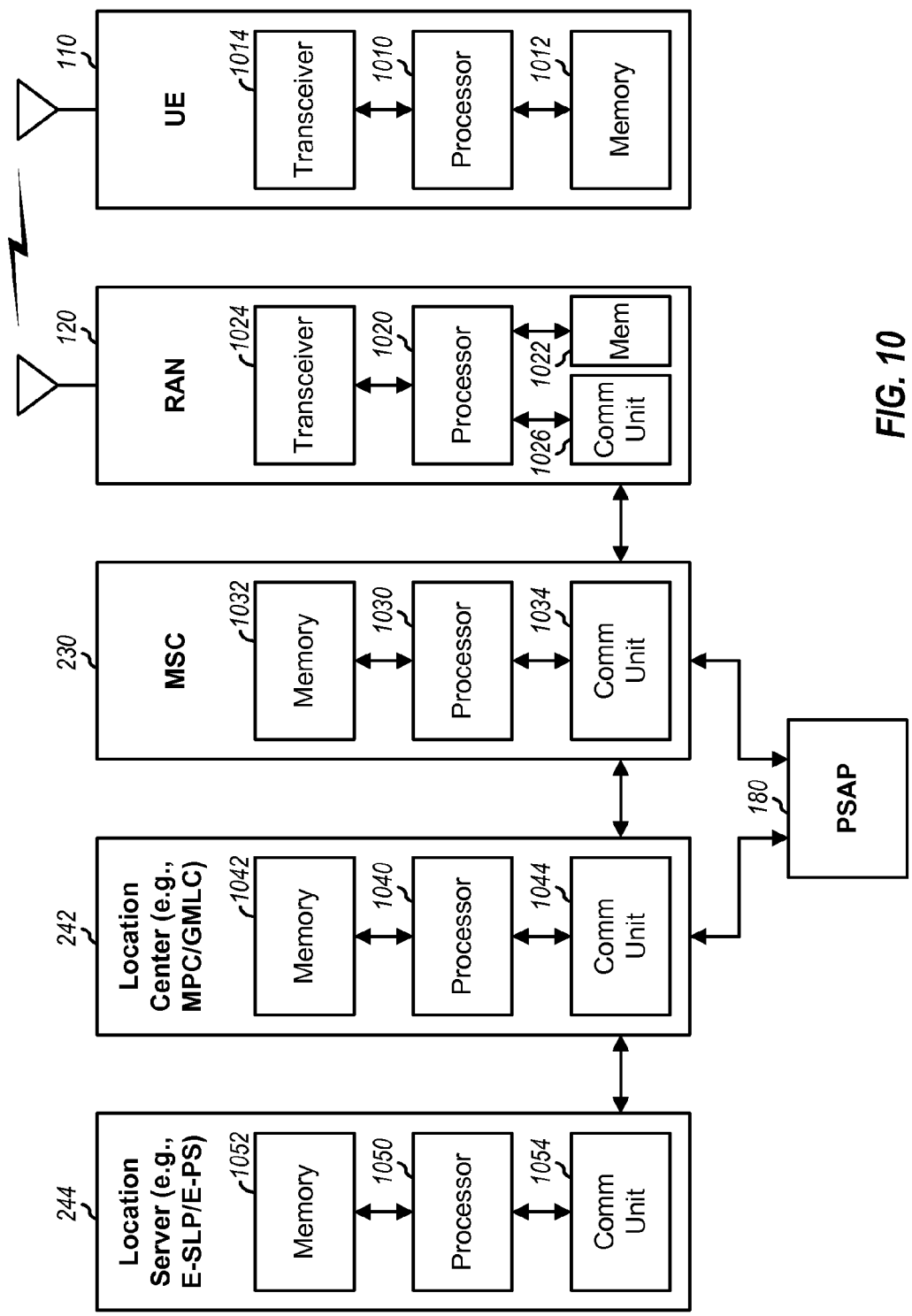
FIG. 10 shows a block diagram of various entities in FIG. 2.

FIG. 10 shows a block diagram an embodiment of UE 110, RAN 120, MSC 230, a location center 242, and a location server 244. Location center 242 may be GMLC 232a, MPC 232b, and/or some other entity. Location server 244 may be E-SLP 234a, E-SLP 234b, E-PS 238, and/or some other entity. For simplicity, FIG. 10 shows only one processor 1010, one memory 1012, and one transceiver 1014 for UE 110, only one processor 1020, one memory 1022, one transceiver 1024, and one communication (Comm) unit 1026 for RAN 120, only one processor 1030, one memory 1032, and one communication unit 1034 for MSC 230, only one processor 1040, one memory 1042, and one communication unit 1044 for location center 242, and only one processor 1050, one memory 1052, and one communication unit 1054 for location server 244. In general, each entity may include any number of processors, memories, transceivers, communication units, controllers, and so on.

On the downlink, base stations in RAN 120 transmit traffic data, signaling, and pilot to UEs within their coverage area. These various types of data are processed by processor 1020 and conditioned by transceiver 1024 to generate a downlink signal, which is transmitted via an antenna. At UE 110, the downlink signals from the base stations are received via an antenna, conditioned by transceiver 1014, and processed by processor 1010 to obtain various types of information for circuit-mode call, location, and other services. For example, processor 1010 may perform processing for UE 110 in the message flows described above. Memories 1012 and 1022 store program codes and data for UE 110 and RAN 120, respectively. On the uplink, UE 110 may transmit traffic data, signaling, and pilot to base stations in RAN 120. These various types of data are processed by processor 1010 and conditioned by transceiver 1014 to generate an uplink signal, which is transmitted via the UE antenna. At RAN 120, the uplink signals from UE 110 and other UEs are received and conditioned by transceiver 1024 and further processed by processor 1020 to obtain various types of information (e.g., data, signaling, reports, and so on). RAN 120 communicates with MSC 230 and other entities via communication unit 1026.

Within MSC 230, processor 1030 performs processing for the MSC, memory 1032 stores program codes and data for the MSC, and communication unit 1034 allows the MSC to communicate with other entities. Processor 1030 may perform processing for MSC 230 in the message flows described above.

Within location center 242, processor 1040 supports location for the UEs, memory 1042 stores program codes and data for the location center, and communication unit 1044 allows the location center to communicate with other entities. Processor 1040 may perform processing for GMLC 232*a* and/or MPC 232*b* in the message flows described above.

Within location server 244, processor 1050 performs location and/or positioning processing for the UEs, memory 1052 stores program codes and data for the location server, and communication unit 1054 allows the location server to communicate with other entities. Processor 1050 may perform processing for E-SLP 234*a*, E-SLP 234*b*, and/or E-PS 238 in the message flows described above.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 1012, 1022, 1032, 1042 and/or 1052 in FIG. 10) and executed by a processor (e.g., processor 1010, 1020, 1030, 1040 and/or 1050). The memory may be implemented within the processor or external to the processor.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. User equipment (UE), comprising:
a transceiver; and
a processor coupled to the transceiver and configured to:
establish an emergency circuit-mode call with a wireless network, wherein the emergency circuit-mode call is routed using a first location server based on a serving cell identity for the UE;
interact with a second location server accessed by the first location server using Mobile Location Protocol or Roaming Location Protocol; and
perform user plane location with the second location server during the emergency circuit-mode call to obtain a position estimate for the UE.

2. The UE of claim 1, wherein the processor is further configured to perform user plane location with the second location server prior to performing call setup with a Public Safety Answering Point (PSAP).

3. The UE of claim 2, wherein the PSAP is selected by the first location server based on the position estimate.

4. The UE of claim 1, wherein the processor is further configured to perform the user plane location with the second location server after performing a call setup with a Public Safety Answering Point (PSAP).

5. The UE of claim 1, wherein the processor is further configured to perform the user plane location with a SUPL Location Platform (SLP) in accordance with Secure User Plane Location (SUPL) to obtain the position estimate, and the SLP is the second location server indicated by the first location server.

6. The UE of claim 1, wherein the processor is further configured to perform the user plane location with a Position Server (PS) in accordance with X.S0024 to obtain the position estimate, and the Position Server is the second location server indicated by the first location server.

7. The UE of claim 1, wherein the processor is further configured to:
receive, from the second location server, a message to initiate the user plane location that comprises an Internet Protocol (IP) address of the second location server; and
communicate with the second location server using the IP address.

8. The UE of claim 1, wherein the processor is further configured to send location information to the wireless network during establishment of the emergency circuit-mode call, and the position estimate for the UE is obtained based on the location information.

9. The UE of claim 1, wherein the processor is further configured to receive a request for an updated position estimate for the UE and to perform the user plane location with the second location server to obtain the updated position estimate.

10. The UE of claim 1, wherein the processor is further configured to authenticate the second location server, be authenticated by the second location server, or both, prior to performing the user plane location.

11. The UE of claim 1, wherein the processor is further configured to send location capabilities of the UE to the wireless network, and the first location server is selected based on the location capabilities of the UE.

12. The UE of claim 1, wherein the processor is further configured to send location information to the wireless network, and the first location server is selected based on the location information.

13. The UE of claim 1, wherein the processor is further configured to communicate with the wireless network for the emergency circuit-mode call, and to exchange messages with the wireless network via packet-mode communication during the user plane location.

14. The UE of claim 1, wherein the processor is further configured to exchange a Short Message Service (SMS) message during the user plane location.

15. The UE of claim 1, wherein the processor is further configured to exchange messages for the user plane location using Transmission Control Protocol (TCP) or both TCP and Internet Protocol (IP).

16. The UE of claim 1, wherein the wireless network is a 3GPP network, and the processor is further configured to establish the emergency circuit-mode call with the 3GPP network.

17. The UE of claim 1, wherein the wireless network is a 3GPP2 network, and the processor is further configured to establish the emergency circuit-mode call with the 3GPP2 network.

18. The UE of claim 1, wherein the first location server is a Gateway Mobile Location Center.

19. The UE of claim 1, wherein the first location server is a Mobile Positioning Center.

20. A method, comprising:
establishing an emergency circuit-mode call for emergency services with a wireless network, wherein the emergency circuit-mode call is routed using a first location server based on a serving cell identity for the UE;
interacting with a second location server accessed by the first location server using Mobile Location Protocol or Roaming Location Protocol; and
performing user plane location with the second location server during the emergency circuit-mode call to obtain a position estimate for the UE.

21. The method of claim 20, wherein the performing user plane location comprises performing the user plane location with a SUPL Location Platform (SLP) in accordance with Secure User Plane Location (SUPL) to obtain the position estimate, and the SLP is the second location server indicated by the first location server.

22. The method of claim 20, wherein the performing user plane location comprises:
receiving, from the second location server, a message to initiate the user plane location that includes an Internet Protocol (IP) address of the second location server; and
communicating with the second location server using the IP address.

23. The method of claim 20, further comprising:
communicating with the wireless network during the emergency circuit-mode call; and
exchanging messages with the wireless network via packet-mode communication during the user plane location.

24. The method of claim 20, wherein the first location server is a Gateway Mobile Location Center.

25. The method of claim 20, wherein the first location server is a Mobile Positioning Center.

26. An apparatus, comprising:
means for establishing an emergency circuit-mode call for emergency services with a wireless network, wherein the emergency circuit-mode call is routed using a first location server based on a serving cell identity for the UE;
means for interacting with a second location server accessed by the first location server using Mobile Location Protocol or Roaming Location Protocol; and
means for performing user plane location with the second location server during the emergency circuit-mode call to obtain a position estimate for the UE.

27. The apparatus of claim 26, wherein the means for performing the user plane location comprises means for performing the user plane location with a SUPL Location Platform (SLP) in accordance with Secure User Plane Location (SUPL) to obtain the position estimate, and the SLP is the second location server indicated by the first location server.

28. The apparatus of claim 26, wherein the means for performing the user plane location comprises means for receiving, from the second location server, a message to initiate the user plane location that includes an Internet Protocol (IP) address of the second location server, and means for communicating with the second location server using the IP address.

29. The apparatus of claim 26, further comprising:
means for communicating with the wireless network during the emergency circuit-mode call; and
means for exchanging messages with the wireless network via packet-mode communication during the user plane location.

30. The apparatus of claim 26, wherein the first location server is a Gateway Mobile Location Center.

31. The apparatus of claim 26, wherein the first location server is a Mobile Positioning Center.

32. A first location server, comprising:
a communication unit; and
a processor coupled to the communication unit and configured to:
receive, from a first entity, a request for information to route an emergency circuit-mode call for emergency services from a user equipment (UE) based on a serving cell identity for the UE;
obtain an interim position estimate for the UE based on the request;
provide the information to the first entity;
receive, from a second entity, a request for a position estimate for the UE;
obtain, using Mobile Location Protocol or Roaming Location Protocol, the position estimate from a second location server supporting user plane location; and
provide the position estimate to the second entity.

33. The first location server of claim 32, wherein the first entity is a Mobile Switching Center (MSC) and the second entity is a Public Safety Answering Point (PSAP).

34. The first location server of claim 32, wherein the processor is further configured to use the interim position estimate to provide the information to the first entity.

35. The first location server of claim 34, wherein the processor is further configured to obtain the interim position estimate from the second location server supporting user plane location.

36. The first location server of claim 32, wherein the information provided to the first entity comprises an Emergency Services Routing Key (ESRK) or an Emergency Services Routing Digit (ESRD) for a Public Safety Answering Point (PSAP).

37. The first location server of claim 32, wherein the processor is further configured to obtain the position estimate from a SUPL Location Platform (SLP) supporting Secure User Plane Location (SUPL), and the SLP is the second location server supporting the user plane location.

38. The first location server of claim 32, wherein the processor is further configured to obtain the position estimate from a Requesting SUPL Location Platform (R-SLP), and the R-SLP obtains the position estimate from a Home SLP (H-SLP) acting as the second location server supporting the user plane location.

39. The first location server of claim 32, wherein the processor is further configured to obtain the position estimate from a Position Server (PS) supporting X.S0024, and the PS is the second location server supporting the user plane location.

40. The first location server of claim 32, wherein the processor is further configured to obtain the position estimate from a Requesting Position Server (R-PS), and the R-PS obtains the position estimate from a Home position server (H-PS) acting as the second location server supporting the user plane location.

41. The first location server of claim 32, wherein the communication unit and the processor and are integrated with a Gateway Mobile Location Center (GMLC) in a 3GPP network.

42. The first location server of claim 32, wherein the communication unit and the processor and are integrated with a Mobile Positioning Center (MPC) in a 3GPP2 network.

43. A method, comprising:
receiving at a first location server, from a first entity, a request for information to route an emergency circuit-mode call for emergency services from user equipment (UE) based on a serving cell identity for the UE;
obtaining an interim position estimate for the UE based on the request;
providing the information to the first entity;
receiving, from a second entity, a request for a position estimate for the UE;
communicating with a second location server supporting user plane location using Mobile Location Protocol or Roaming Location Protocol to obtain the position estimate; and
providing the position estimate to the second entity.

44. The method of claim 43, wherein the first location server is a Gateway Mobile Location Center.

45. The method of claim 43, wherein the first location server is a Mobile Positioning Center.

46. A first location server, comprising:
a communication unit; and
a processor coupled to the communication unit and configured to:
receive, using Mobile Location Protocol or Roaming Location Protocol, a request for a position estimate of user equipment (UE) having an emergency circuit-mode call for emergency services with a wireless network;
perform user plane location with the UE to obtain the position estimate after a second location server obtains an interim position estimate for the UE; and
return, using the Mobile Location Protocol or the Roaming Location Protocol, the position estimate to the second location server.

47. The first location server of claim 46, wherein the processor is further configured to perform the user plane location with the UE in accordance with Secure User Plane Location (SUPL) to obtain the position estimate.

48. The first location server of claim 46, wherein the processor is further configured to perform the user plane location with the UE in accordance with X.S0024 to obtain the position estimate.

49. The first location server of claim 46, wherein the processor is further configured to send a message to initiate the user plane location with the UE, and the message comprises an Internet Protocol (IP) address of the first location server to enable the UE to communicate with the first location server during the user plane location.

50. The first location server of claim 46, wherein the processor is further configured to act as a substitute for a home location server of the UE during the emergency circuit-mode call for emergency services.

51. The first location server of claim 46, wherein the processor is further configured to select a visited location server to support the user plane location for the UE, and configured to transfer messages exchanged between the visited location server and the UE.

52. The first location server of claim 46, wherein the second location server is a Gateway Mobile Location Center.

53. The first location server of claim 46, wherein the second location server is a Mobile Positioning Center.

54. A method, comprising:
receiving, at a first location server and from a second location server, using Mobile Location Protocol or Roaming Location Protocol, a request for a position estimate of user equipment (UE) having an emergency circuit-mode call for emergency services with a wireless network;
performing user plane location with the UE to obtain the position estimate after the second location center obtains an interim position estimate for the UE; and
returning the position estimate to the second location server using the Mobile Location Protocol or the Roaming Location Protocol.

55. The method of claim 54, wherein the performing user plane location comprises sending a message to the UE to initiate the user plane location with the UE, and the message includes an Internet Protocol (IP) address of the first location server to enable the UE to communicate with the first location server during the user plane location.

56. The method of claim 54, wherein the second location server is a Gateway Mobile Location Center.

57. The method of claim 54, wherein the second location server is a Mobile Positioning Center.

58. User equipment (UE), comprising:
a transceiver; and
a processor coupled to the transceiver and configured to:
establish an emergency circuit-mode call for emergency services with a wireless network, wherein the emergency circuit-mode call is routed using a first location server based on a serving cell identity for the UE;
perform authentication of a second location server selected by the wireless network for the emergency circuit-mode call; and
interact with the second location server to perform user plane location to obtain at least one position estimate for the UE.

59. The UE of claim 58, wherein the processor is further configured to perform mutual authentication with the second location server.

60. The UE of claim 58, wherein the processor is further configured to receive, from the second location server, a message to initiate the user plane location and to authenticate the second location server if the message indicates the location processing is for an emergency call and the UE is engaged in the emergency circuit-mode call.

61. The UE of claim 58, wherein the processor is further configured to perform Transport Layer Security (TLS) public key authentication using a root public key certificate stored at the UE to verify a public key of the second location server.

62. The UE of claim 58, wherein the processor is further configured to generate a pre-share key (PSK) based on common information available at the UE and the wireless network, and to perform the authentication using the pre-shared key.

63. The UE of claim 58, wherein the processor is further configured to perform the authentication based on Generic Bootstrap Architecture (GBA).

64. The UE of claim 58, wherein the processor is further configured to perform the authentication in accordance with Secure User Plane Location (SUPL) or X.S0024.

65. The UE of claim 58, wherein the second location server is a SUPL Location Platform (SLP) supporting Secure User Plane Location (SUPL).

66. A method, comprising:
establishing, with user equipment (UE), an emergency circuit-mode call for emergency services with a wireless network, wherein the emergency circuit-mode call is routed using a first location server based on a serving cell identity for the UE;
performing authentication of a second location server selected by the wireless network for the emergency circuit-mode call; and
interacting with the second location server to perform user plane location to obtain at least one position estimate for the UE.

67. The UE of claim 66, wherein the second location server is a SUPL Location Platform (SLP) supporting Secure User Plane Location (SUPL).

68. A non-transitory computer-readable medium, comprising instructions stored thereon that, if executed by a processor, cause the processor to:
establish an emergency circuit-mode call for emergency services with a wireless network, wherein the emergency circuit-mode call is routed using a first location server based on a serving cell identity for the UE;
interact with a second location server accessed by the first location server using Mobile Location Protocol or Roaming Location Protocol; and
perform user plane location with the second location server during the emergency circuit-mode call to obtain a position estimate for user equipment (UE).

69. The non-transitory computer-readable medium of claim 68, wherein the first location server is a Mobile Positioning Center.

70. The non-transitory computer-readable medium of claim 68, wherein the first location server is a Gateway Mobile Location Center.

71. A non-transitory computer-readable medium, comprising instructions stored thereon that, if executed by a processor, cause the processor to:
receive at a first location server, from a first entity, a request for information to route an emergency circuit-mode call for emergency services from user equipment (UE) based on a serving cell identity for the UE;
obtain an interim position estimate for the UE based on the request;
provide the information to the first entity;
receive, from a second entity, a request for a position estimate for the UE;
communicate with a second location server supporting user plane location to obtain, using Mobile Location Protocol or Roaming Location Protocol, the position estimate; and
provide the position estimate to the second entity.

72. The non-transitory computer-readable medium of claim 71, wherein the first location server is a Mobile Positioning Center.

73. The non-transitory computer-readable medium of claim 71, wherein the first location server is a Gateway Mobile Location Center.

74. A non-transitory computer-readable medium, comprising instructions stored thereon that, if executed by a processor, cause the processor to:
receive, at a first location server and from a second location server, using Mobile Location Protocol or Roaming Location Protocol, a request for a position estimate of user equipment (UE) having an emergency circuit-mode call for emergency services with a wireless network;
perform user plane location with the UE to obtain the position estimate after the second location server obtains an interim position estimate for the UE; and
return the position estimate to the second location server using the Mobile Location Protocol or the Roaming Location Protocol.

75. The non-transitory computer-readable medium of claim 74, wherein the second location server is a Mobile Positioning Center.

76. The non-transitory computer-readable medium of claim 74, wherein the second location server is a Gateway Mobile Location Center.

77. A non-transitory computer-readable medium, comprising instructions stored thereon that, if executed by a processor, cause the processor to:
establish, with user equipment (UE), an emergency circuit-mode call for emergency services with a wireless network, wherein the emergency circuit-mode call is routed using a first location server based on a serving cell identity for the UE;
perform authentication of a second location server selected by the wireless network for the emergency circuit-mode call; and
interact with the second location server to perform user plane location to obtain at least one position estimate for the UE.

78. The non-transitory computer-readable medium of claim 77, wherein the second location server is a SUPL Location Platform (SLP) supporting Secure User Plane Location (SUPL).

79. An apparatus, comprising:
means for receiving at a first location server, from a first entity, a request for information to route an emergency circuit-mode call for emergency services from user equipment (UE) based on a serving cell identity for the UE;
means for obtaining an interim position estimate for the UE based on the request;
means for providing the information to the first entity;
means for receiving, from a second entity, a request for a position estimate for the UE;
means for communicating with a second location server supporting user plane location using Mobile Location Protocol or Roaming Location Protocol to obtain the position estimate; and
means for providing the position estimate to the second entity.

80. An apparatus, comprising:
means for receiving, at a first location server and from a second location server, using Mobile Location Protocol or Roaming Location Protocol, a request for a position estimate of user equipment (UE) having an emergency circuit-mode call for emergency services with a wireless network;
means for performing user plane location with the UE to obtain the position estimate after the second location center obtains an interim position estimate for the UE; and means for returning the position estimate to the second location server using the Mobile Location Protocol or the Roaming Location Protocol.

81. An apparatus, comprising:

means for establishing, with user equipment (UE), an emergency circuit-mode call for emergency services with a wireless network, wherein the emergency circuit-mode call is routed using a first location server based on a serving cell identity for the UE;

means for performing authentication of a second location server selected by the wireless network for the emergency circuit-mode call; and means for interacting with the second location server to perform user plane location to obtain at least one position estimate for the UE.

* * * * *